(12) United States Patent
Chung

(10) Patent No.: US 10,203,872 B2
(45) Date of Patent: Feb. 12, 2019

(54) CREATION METHOD FOR CHARACTERS/WORDS AND THE INFORMATION AND COMMUNICATION SERVICE METHOD THEREBY

(71) Applicant: Neopad Inc., Seoul (KR)

(72) Inventor: Heesung Chung, Cheonan-si (KR)

(73) Assignee: Neopad Inc., Seoul (KR)

( * ) Notice: Subject to any disclaimer, the term of this patent is extended or adjusted under 35 U.S.C. 154(b) by 129 days.

(21) Appl. No.: 15/146,387

(22) Filed: May 4, 2016

(65) Prior Publication Data

US 2016/0320965 A1  Nov. 3, 2016

Related U.S. Application Data

(63) Continuation-in-part of application No. 12/245,015, filed on Oct. 3, 2008, now abandoned, which is a
(Continued)

(51) Int. Cl.
*G06F 3/0488* (2013.01)
*G06F 3/01* (2006.01)
(Continued)

(52) U.S. Cl.
CPC .......... *G06F 3/04886* (2013.01); *G06F 3/018* (2013.01); *G06F 3/0219* (2013.01); *G06F 3/0236* (2013.01); *H04M 2250/70* (2013.01)

(58) Field of Classification Search
None
See application file for complete search history.

(56) References Cited

U.S. PATENT DOCUMENTS 4,531,119 A  7/1985  Nakayama et al.
4,872,196 A  10/1989  Royer et al.
(Continued)

FOREIGN PATENT DOCUMENTS

JP  59-099536 A  6/1984
JP  2000-112636 A  4/2000
(Continued)

OTHER PUBLICATIONS

Notice of Preliminary Rejection dated Apr. 29, 2010, issued in counterpart European Patent application 03710502.0 (5 pages).
(Continued)

*Primary Examiner* — Toan H Vu
(74) *Attorney, Agent, or Firm* — Westerman, Hattori, Daniels & Adrian, LLP

(57) ABSTRACT

This invention rotates to a method for entering characters into a small keypad with a limited number of keys or information appliances with a liquid crystal panel such as PDA. The object of the present invention is to provide a character entry method to ensure the efficiency of letter entry, the expandability and adaptability of information services, and the information and communication service method thereby, which substantially obviates problems due to limitations and disadvantages of the multi-tap and single-tap method. The distinctive features of the present invention are representative character keys, a virtual keypad, and virtual key entry method on the virtual keypad mode, in entering multiple characters by means of a keypad with about 12 keys. Moreover, the present invention provides a character entry method ensuring the input efficiency of various characters. The present invention can be utilized as an interface in the mobile info-communication services.

6 Claims, 25 Drawing Sheets

Related U.S. Application Data continuation of application No. 10/482,131, filed on Apr. 22, 2005, now abandoned.

(51) Int. Cl.
*G06F 3/02* (2006.01)
*G06F 3/023* (2006.01)

(56) References Cited

U.S. PATENT DOCUMENTS

| | | | |
|---|---|---|---|
| 5,457,454 A | 10/1995 | Sugano | |
| 6,005,498 A | 12/1999 | Yang et al. | |
| 6,104,317 A | 8/2000 | Panagrossi | |
| 6,130,665 A | 10/2000 | Ericsson | |
| 6,307,541 B1 | 10/2001 | Ho et al. | |
| 6,809,725 B1 | 10/2004 | Zhang | |
| 7,257,528 B1 | 8/2007 | Ritchie et al. | |
| 2003/0013483 A1 | 1/2003 | Ausems et al. | |
| 2003/0048897 A1 | 3/2003 | Luo | |
| 2003/0112277 A1* | 6/2003 | Shteyn | G06F 3/0233 715/773 |
| 2004/0021696 A1 | 2/2004 | Molgaard | |
| 2004/0108994 A1 | 6/2004 | Kato | |
| 2008/0233546 A1* | 9/2008 | Baker | G09B 5/06 434/169 |
| 2008/0284744 A1* | 11/2008 | Park | G06F 3/0486 345/173 |
| 2008/0320410 A1* | 12/2008 | Whytock | G06F 3/04886 715/773 |
| 2009/0058823 A1* | 3/2009 | Kocienda | G06F 3/0236 345/173 |
| 2009/0153389 A1* | 6/2009 | Kerr | H04N 5/44513 341/176 |
| 2009/0158222 A1* | 6/2009 | Kerr | G06F 3/016 715/867 |
| 2009/0231281 A1* | 9/2009 | Whytock | G06F 3/04886 345/168 |
| 2009/0303187 A1* | 12/2009 | Pallakoff | G06F 3/04886 345/169 |
| 2010/0011299 A1* | 1/2010 | Brodersen | H04L 67/36 715/740 |
| 2012/0030609 A1* | 2/2012 | Whytock | G06F 3/04886 715/773 |
| 2013/0067387 A1* | 3/2013 | Kim | G06F 3/0481 715/780 |
| 2013/0181915 A1 | 7/2013 | Chen | |
| 2017/0003876 A1* | 1/2017 | Marsden | H03K 17/9622 |

FOREIGN PATENT DOCUMENTS

| | | |
|---|---|---|
| JP | 2001-051991 A | 2/2011 |
| KR | 1020020019128 A | 3/2002 |
| WO | 01-53924 A1 | 7/2001 |

OTHER PUBLICATIONS

Complaint for Patent Infringement Suit (No. 2011-114712) filed on Oct. 17, 2011 in Seoul Central District Court of Republic of Korea based on counterpart Korean Patent, pp. 1 and 21, with English Translation (6 pages).

Request for Trial for Patent Invalidity Suit (No. 2011-3215) filed on Dec. 21, 2011 in Intellectual Property Tribunal of Republic of Korea with respect to counterpart Korean Patent, pp. 1-3, with English translation (5 pages).

* cited by examiner

Fig. 15

| | A | D |
|---|---|---|
| Q  Z | ←B  C→ | E  F |
| G | J | M |
| H  I | K  L | N  O |
| P | T | W |
| R  S | U  V | X  Y |
| * | 0 | # |

Fig. 16

[Destination]

From: Tokyo

To : New York note :

| A/a | confirm | up |

CREATION METHOD FOR CHARACTERS/WORDS AND THE INFORMATION AND COMMUNICATION SERVICE METHOD THEREBY

This application is a continuation-in-part of prior application Ser. No. 12/245,015, filed Oct. 3, 2008, which is a continuation of application Ser. No. 10/482,131, filed Apr. 22, 2005, which claims priority from Korean Patent Application No. 2002-0017228, filed on Mar. 29, 2002, and International Application No. PCT/KR03/00635, filed on Mar. 28, 2003, the disclosures of which are incorporated herein in its entirety by reference.

TECHNICAL FIELD

This invention relates to a method for entering characters into a small keypad with a limited number or keys or information appliances with a liquid crystal panel such as a PDA (personal digital assistant), and more particularly, to a character entry method that a user can easily learn and use and whose system can be easily established.

BACKGROUND ART

Mobile information appliances such as a cellular telephone generally have 10-12 keys in number to enter words with. In case of a language having 10-12 characters in number, it is easy to enter words because a character can be allocated to a key. However, most languages have various and lots of characters, and it is impossible to allocate a character to a key. In addition, it is inconvenient to enter characters into small mobile information appliances such as a PDA because it has a full-size software-driven keyboard to enter words by means of pen-touching method.

FIG. 1a shows a keypad of cellular phone according to u Japanese standard for entering Japanese texts. As shown in FIG. 1a, the Japanese alphabet is distributed in sets of five letters to be allocated to keys, according to the configuration table of the Japanese alphabet. Each key represents a set of characters. For example, the characters of "あ" column, "あいうえお", are allocated to "1" key, and the character of "か" column, "かきくけこ", to "2" key. The characters of "さ, た, . . . " columns are allocated to "3, 4, . . . " keys, respectively. Currently, the common way to enter Japanese texts using such a conventional Japanese keypad is through the multi-tap method. For example, if a user wants to enter a word, "かえる", he or she has to press "2" key once for entering "か", press "1" key four times according to the order listed on the key for entering "え", and press "9" key five times according to the order listed on the key for entering "る". As a result, the entry of "かえる" needs ten times of key presses.

FIG. 1b shows a keypad of a cellular telephone according to an international standard for entering English texts. The 26 characters are allocated to 10 keys. The common way to enter English texts using such a conventional English keypad is also through the multi-tap method.

FIG. 1c shows a keypad of cellular telephone in which Hebraic alphabet is allocated to 10 keys so that a user can enter Hebraic characters.

FIG. 1d shows a keypad of cellular telephone in which Thai alphabet is allocated to 10 keys so that a user can enter Thai characters.

FIG. 1e shows a keypad of cellular telephone in which strokes are allocated to 10 keys so that a user can enter simplified Chinese characters.

FIG. 1f shows a keypad of cellular telephone in which Bopomofo symbols are allocated to 10 keys so that a user can enter traditional Chinese characters.

FIG. 1g shows a keypad of cellular telephone in which Korean alphabet allocated to 10 keys so that a user can enter Korean characters.

Currently, the common way to enter a text using the above-mentioned keypads is through the multi-tap method. However, the multi tap method is very cumbersome and can cause a user to make mistakes on the character entry since groups of multiple letters are allocated on as limited number of keys and multiple letters are overlaid on each of these keys. To overcome these disadvantages, a single-tap method has been developed. As a single-tap method, there are disclosed T9 (http://www.t9.com), eZi (http://wwwzicorp.com), itap (http://www.mot.com/lexicus/html/itap.html), and for entering Japanese texts, POS (http://www.muchy.com). One feature of these methods is one tap (key press) for one letter.

FIG. 1h shows an embodiment according to the eZi method. The most important difference between the single-tap and the multi-tap method is related to whether or not to use a given dictionary for a given language. The single-tap method is based on an algorithm, which displays automatically the corresponding words after searching a given dictionary for a given language or combinations of the entered characters. For example of the eZi method, if a user want to enter "boy", he/she presses "1" key having letters "ABC" imprinted thereon for entering "b", "6" key for entering "o", and "9" key for entering "y". When "b" is entered, the system searches a given dictionary using "b" as a search key, and then, when "o" is entered, "bo" is used as a search key. Finally, when "y" is entered, the system finds "boy", as a word, in the dictionary, and the user selects and enters the word "boy".

During the entering, nine (3×3×3) character combinations are generated from ABC, MNO, and WXY with the key entries. With the first key press, "ABC" is entered at once, and with the second key press "MNO" is entered at once, thereby displaying the possible combinations of letters in ABC×MNO, {AM, AN, AO, BM, BN, BO, CM, CN, CO}. Here, the desired character combination is "bo". The system searches continuously the dictionary for the next character entry although there might be right words among the two-character combinations, and finally identifies the desired word. In the process, the character combinations associated with the key presses, which can be used as the beginning of the desired word, for example, "bo" can be selected and displayed continuously. Then, the system searches the dictionary in order to find all of the words, which include "bo" in the beginning of the word, and displays the resulting words. The user can identify and select the desired word among the words that the system speculates by oneself and displays.

FIG. 1i shows the POS system, which is a Japanese language calculation-input system according to the single-tap method. The algorithm is the same with the above-mentioned one.

As described above, there is provided the single-tap method instead of the multi-tap method, in order to seek the efficiency of character entry by allocating multiple letters to a limited number of keys of a small keypad. The singe-tap method pursues the efficiency of character entry through the reduced number of times of key presses and an accuracy of character entry.

In a small keypad having a limited number of keys, multiple letters have inherently to be allocated to a key, and, therefore, the basic way to access a letter is a multi-tap method under the circumstances. However, the multi-tap method needs lots of key presses and has high possibility that a user may make mistakes on the character entry. On the other hand, the single-tap method can reduce the number of times of key presses, but has to establish a given dictionary for a given language in the system and to register new words continuously, such as vocabularies newly created by a user and abbreviations, in the dictionary. Besides it is physically impossible to register all the vocabularies required in the rapidly developing information and telecommunication circumstances, such as names, internet addresses and homepage addresses, in the dictionary. In fact, if a vocabulary is not registered in the dictionary, a user has to use the multi-tap method at the same time in order to enter the vocabulary. Therefore, the single-tap method as a one-key-for-one-letter way has limitations and disadvantages which give the system high load due to lots of character combinations according to the entered multiple letters and dictionary-searching according to the character combinations.

DISCLOSURE OF INVENTION

Accordingly, the present invention is directed to a character entry method to ensure the efficiency of letter entry, the expandability and adaptability of information services, and the information and communication service method thereby, which substantially obviate one or more problems due to limitations and disadvantages of the multi-tap and single-tap method.

The distinctive features of the present invention are representative character keys, as virtual keypad, and virtual key entry method on the virtual keypad mode, in entering multiple characters by means of as keypad with about 12 keys. That is, the present invention provides a method for character entry that the desired character can be entered separately on each of a real keypad entry mode and a virtual keypad entry mode according to the prescribed way although the identical key is pressed in each of both modes, by establishing separately the entry mode of a virtual keypad that maintains the state of an independent entry mode regardless of the entry mode of a real keypad and the key presses on a real keypad.

BRIEF DESCRIPTION OF THE DRAWINGS

Further objects and advantages of the invention can be more fully understood from the following detailed description taken in conjunction with the accompanying drawings, in which:

FIG. 15 illustrates an example of alphabet entry on a PDA in accordance with the present invention;

FIG. 16 illustrates an example of an information service method using the preferred embodiment of the present invention.

BEST MODE FOR CARRYING OUT THE INVENTION

To establish the virtual keypad according to the present invention first, characters of a given language are grouped according to a particular criterion. The "particular criterion" includes the order of characters, the identical phonetic value of characters, the same shape of characters, the similar grammatical characteristics of characters, the visibility and recognizability of users, and so on. The number of characters in a group is preferably 5~12, because it is suitable for allocating the groups of characters to a small keypad having about 12 keys in number and can be handled easily. After grouping characters representative characters are selected from characters of a group.

Figure 7:
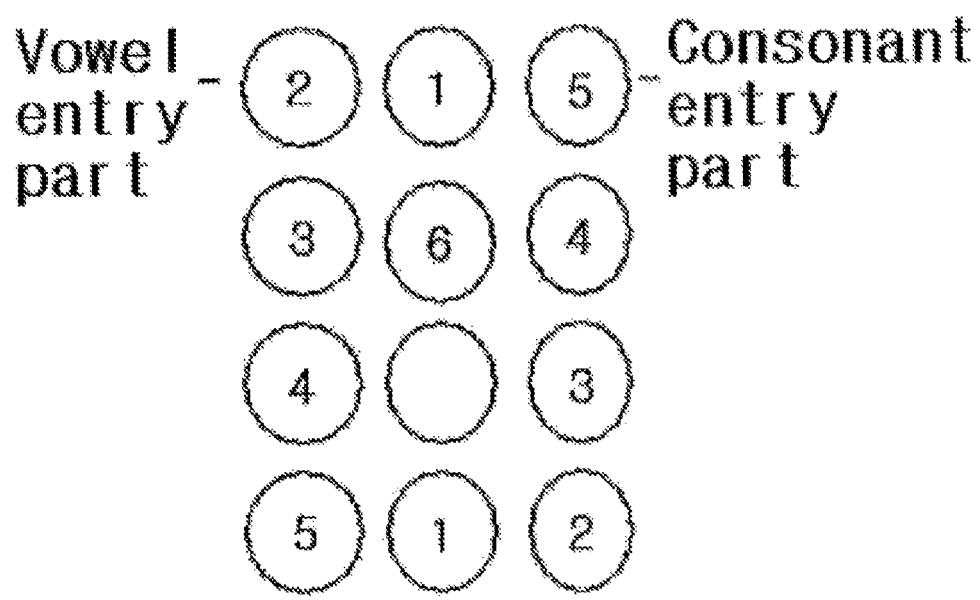
FIG. 7 illustrates a key layout of a virtual keypad according to the preferred embodiment of the present invention.
Figure 8:
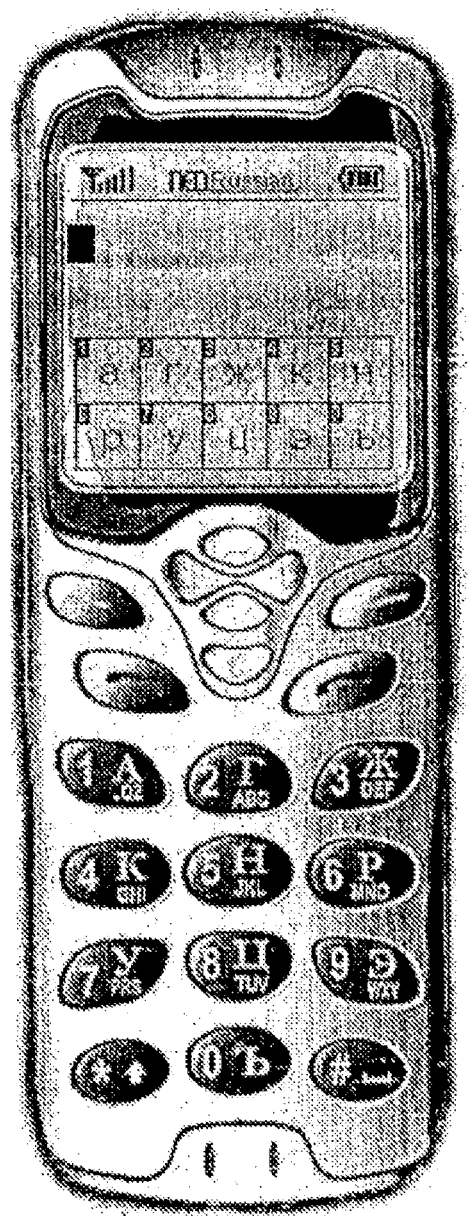
FIG. 8 illustrates a depiction of a cellular telephone having a keypad for Russian character entry in accordance with the present invention.
Figure 9:
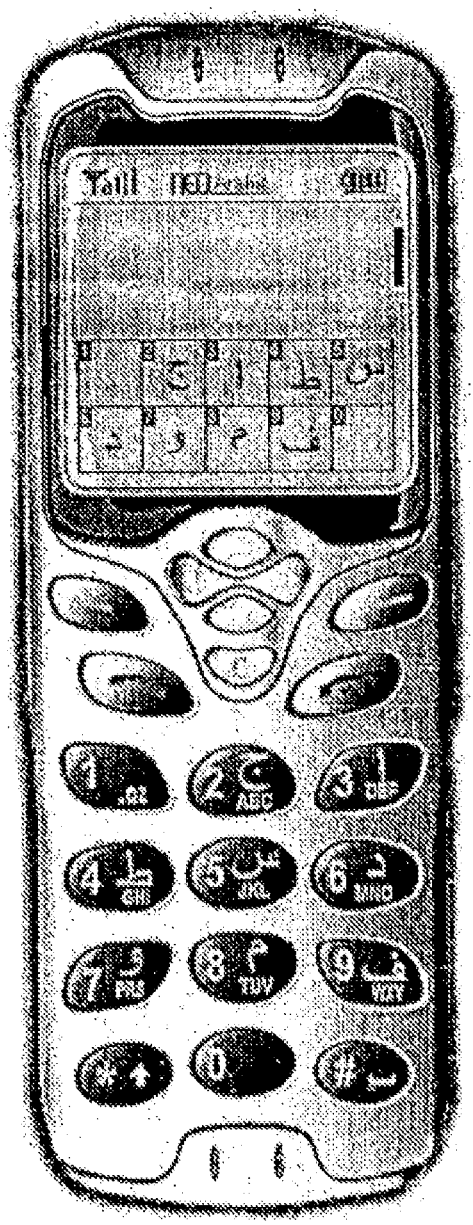
FIG. 9 illustrates a depiction of a cellular telephone having a keypad for Arabic Character entry in accordance with the present invention.
Figure 10:
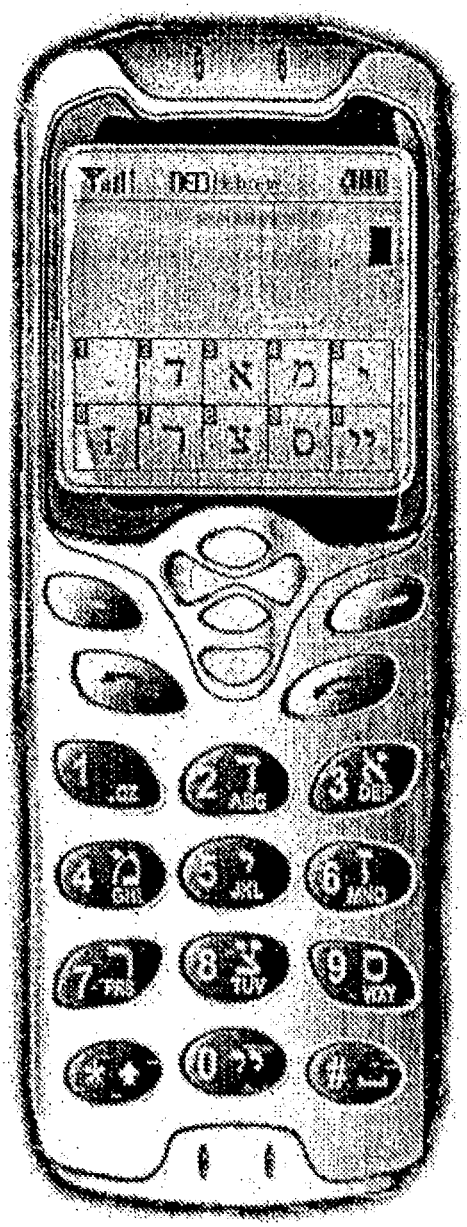
FIG. 10 illustrates a depiction of a cellular telephone having as keypad for Hebraic character entry in accordance with the present invention.
Figure 11:
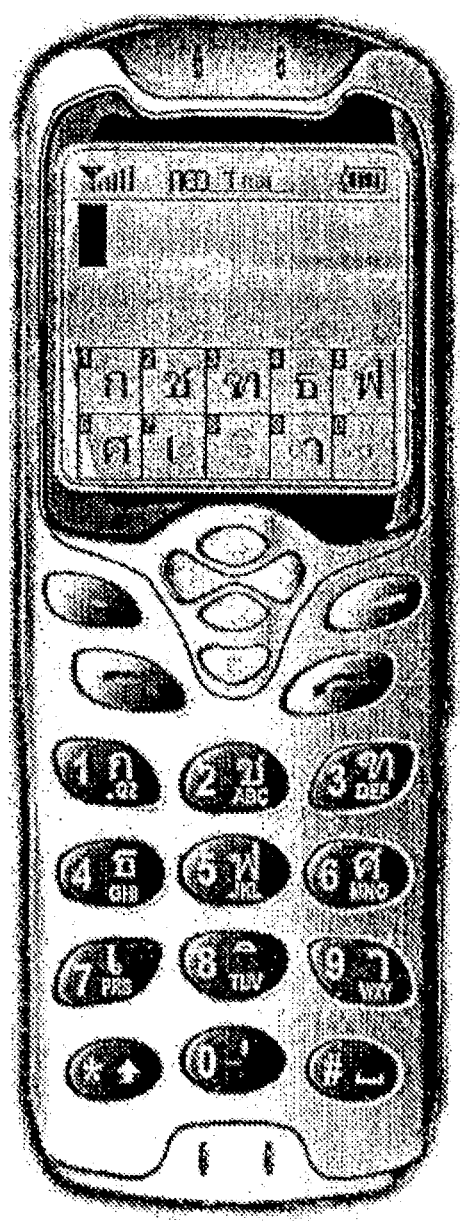
FIG. 11 illustrates a depiction of a cellular telephone having a keypad for Thai character entry in accordance with the present invention.
Figure 12:
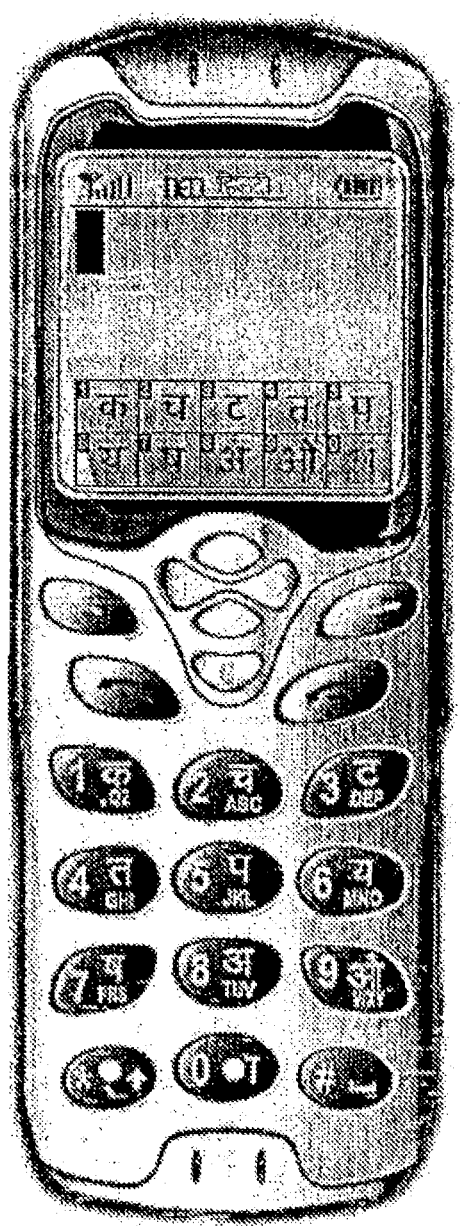
FIG. 12 illustrates a depiction of a cellular telephone having a keypad for Devanagari character entry in accordance with the present invention.

It is desirable for the representative characters to have common features of each character. The number of the representative characters in a group is preferably no more than three, because the representative characters in a group are marked on a small key and the visibility and recognizability for characters by a user is decreased for many representative characters. Therefore, in selecting presentative characters, a criterion may include the visibility and recognizability by a user. Subsequently, the representative characters of each group are allocated to about 12 keys on a keypad. FIGS. 1a~1g illustrate character layouts for entering given languages on information appliances. FIG. 7 shows an entry key layout of a virtual keypad according to the present invention. FIGS. 8~14 illustrate examples of key layouts of real keypads for use in information appliances.

Figure 1A:
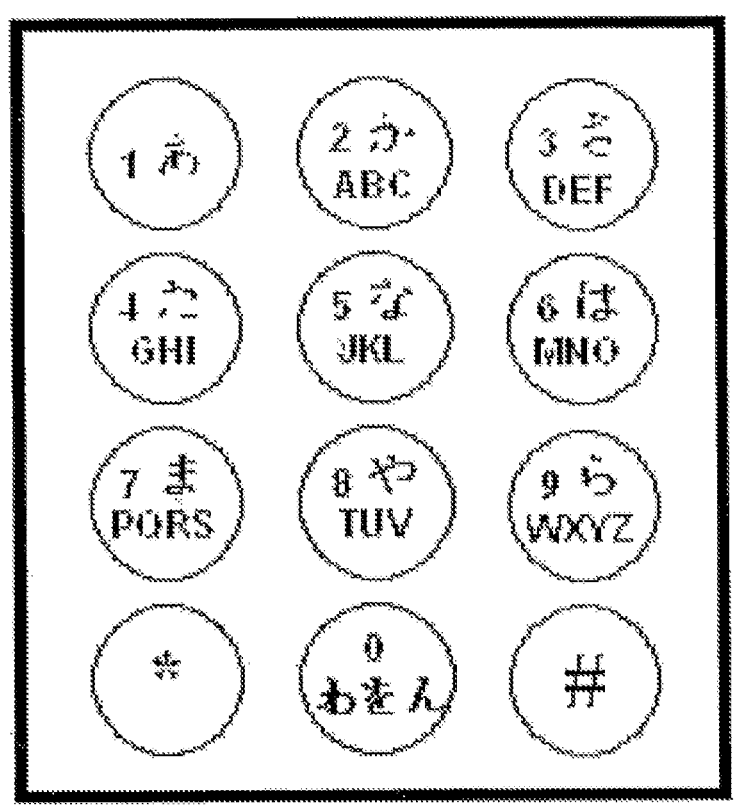
FIG. 1a shows a Japanese character layout of a keypad of a cellular telephone, as a de facto Japanese standard.
Figure 1B:
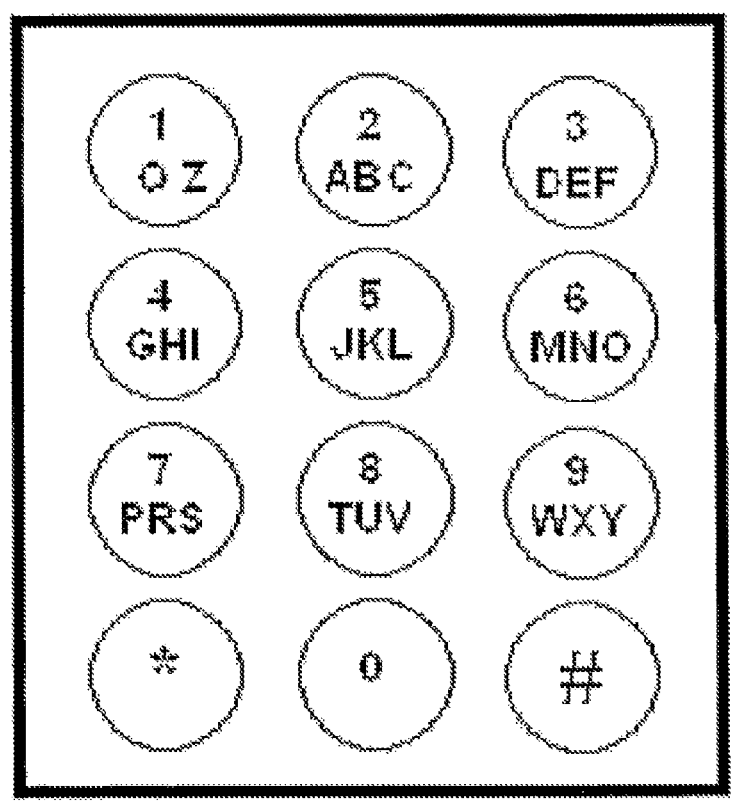
FIG. 1b shows an alphabet layout of a keypad of a cellular telephone, as the international standard.
Figure 1C:
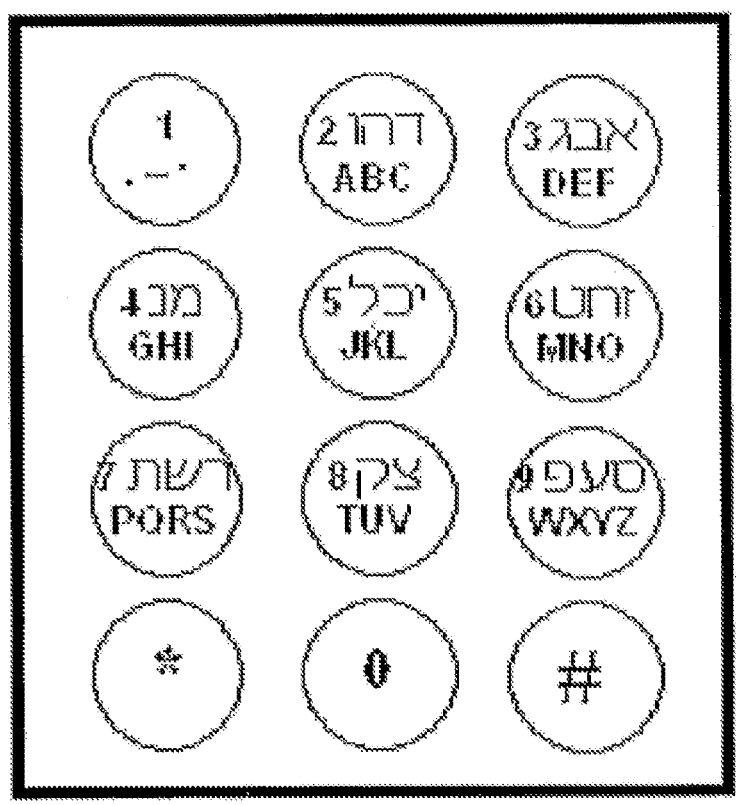
FIG. 1c shows a Hebraic character layout of a keypad of a cellular telephone, as a de facto standard.
Figure 1D:
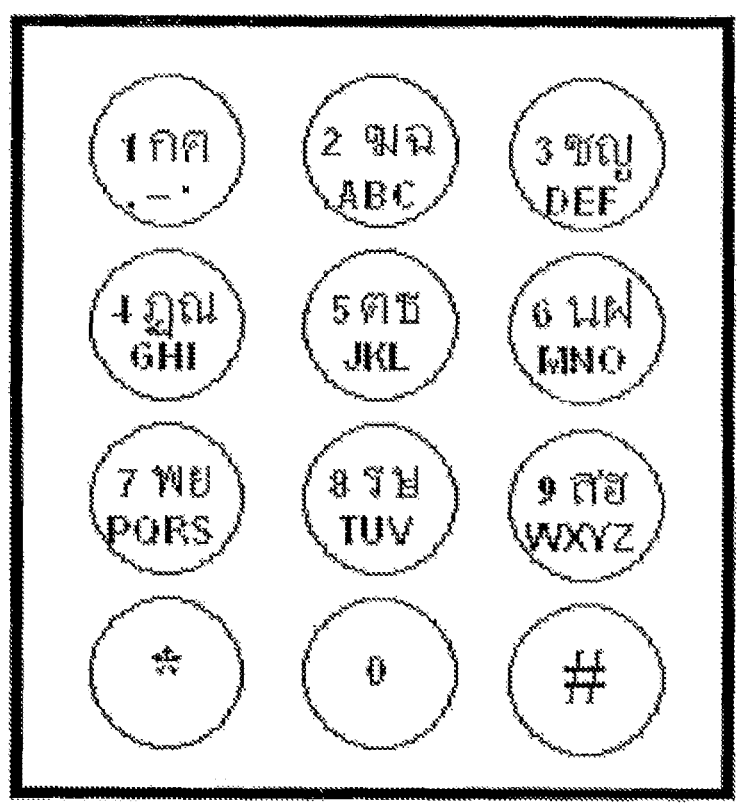
FIG. 1d shows a Thai character layout of a keypad of a cellular telephone.
Figure 1E:
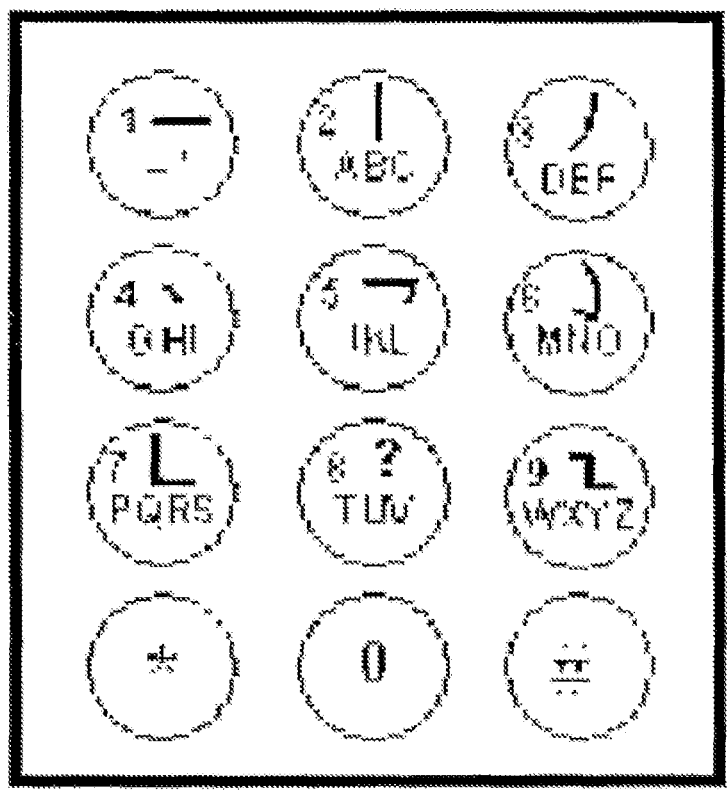
FIG. 1e shows a stroke layout of a keypad of a cellular telephone for entering Chinese characters.

FIG. 1b is a keypad of the alphabet as an international standard. As shown in FIG. 1b, "2" key has letters "ABC" imprinted thereon. Each number key has letters imprinted thereon, respectively. The alphabet is grouped into sets of 3 letters according to the alphabetical order, and "Q" and "Z" is allocated to "1" key due to the low frequency of use. We can have a representative character for each key in such a keypad. For example, among "ABC", "A" can become a representative character as a first character, or "B" as a middle character. Also, various features such as the frequency of appearance, representative phonetic value and representative form of characters are used as a criterion.

The representative character according the present invention functions as a representative that stands for the characters allotted to the key and as an index key to enter the particular characters of each group, and, more particularly, is used t invoke, select, enter and search the particular characters of each group. Moreover, another feature of the representative character of the present invention is that pressing of the representative character changes a real keypad input mode into a virtual keypad input mode.

Figure 2:
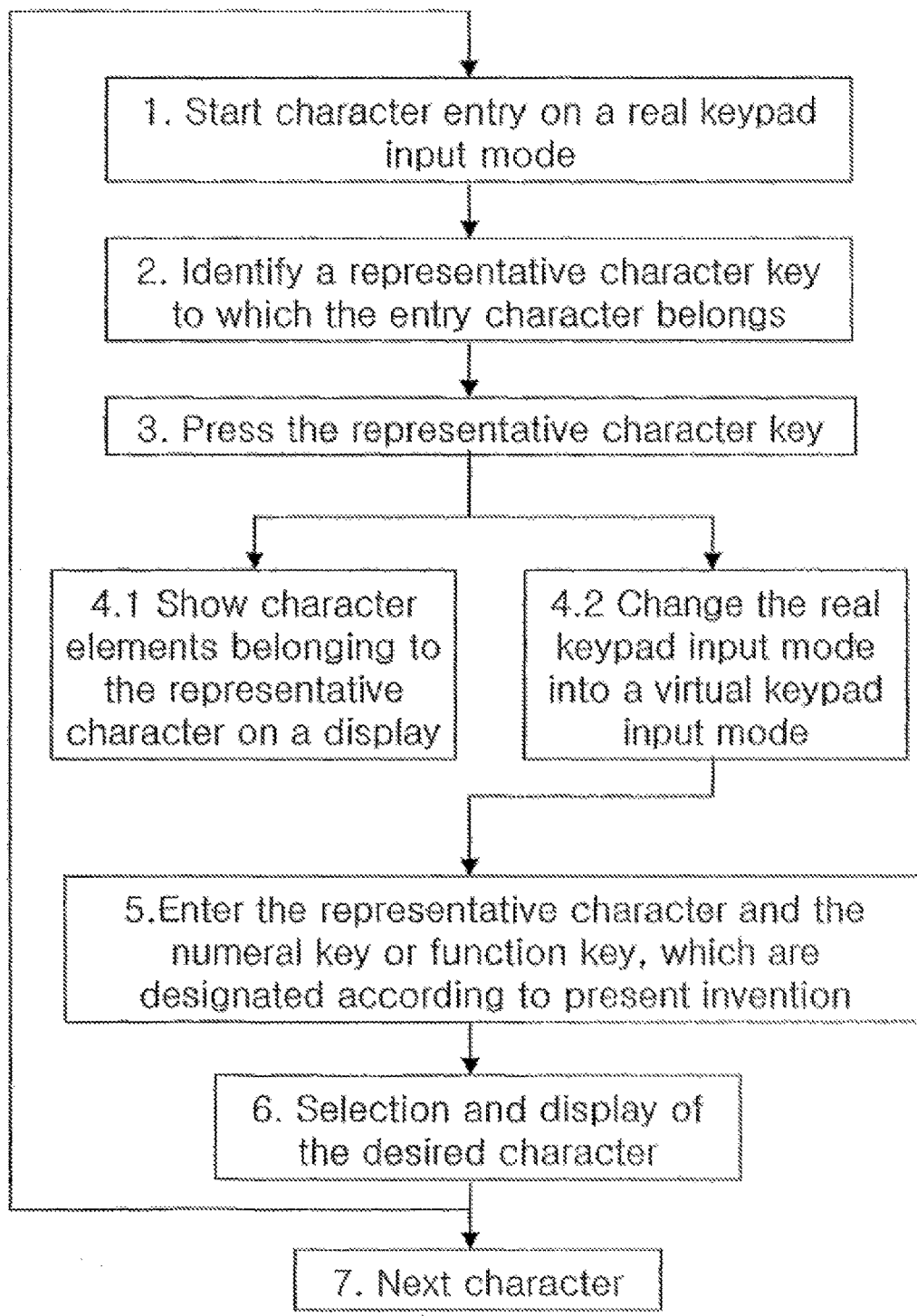
FIG. 2 illustrates a flow chart of Method 1 in accordance with the present invention.

FIG. 2 illustrates a flow chart of as character entry method after grouping characters, designating representative characters for each group and allocating the representative characters to a limited number of keys, as an embodiment (hereinafter referred to as "Method 1") using the representative character as an index key and a key for the mode change. Referring to FIG. 2, in the phase 2, the user recognizes the representative character key to which the desired character belongs. After identifying the representative character key, the user selects and presses the representative key in the phase 3. The phases 4.1 and 4.2 are the response results of the system according to the present invention after pressing the representative character key. The system displays all the characters allotted to the representative character key, and changes a real keypad input mode into a virtual keypad input mode where the user can select and enter the only characters shown on the display. Subsequently, in phase 6, the user selects and enters the desired character among the displayed characters on the virtual keypad input mode. Here, after the user finishes entering the desired character on the virtual keypad input mode, the system returns to the initial state for entering a character to become the real keypad input mode.

Figure 3:
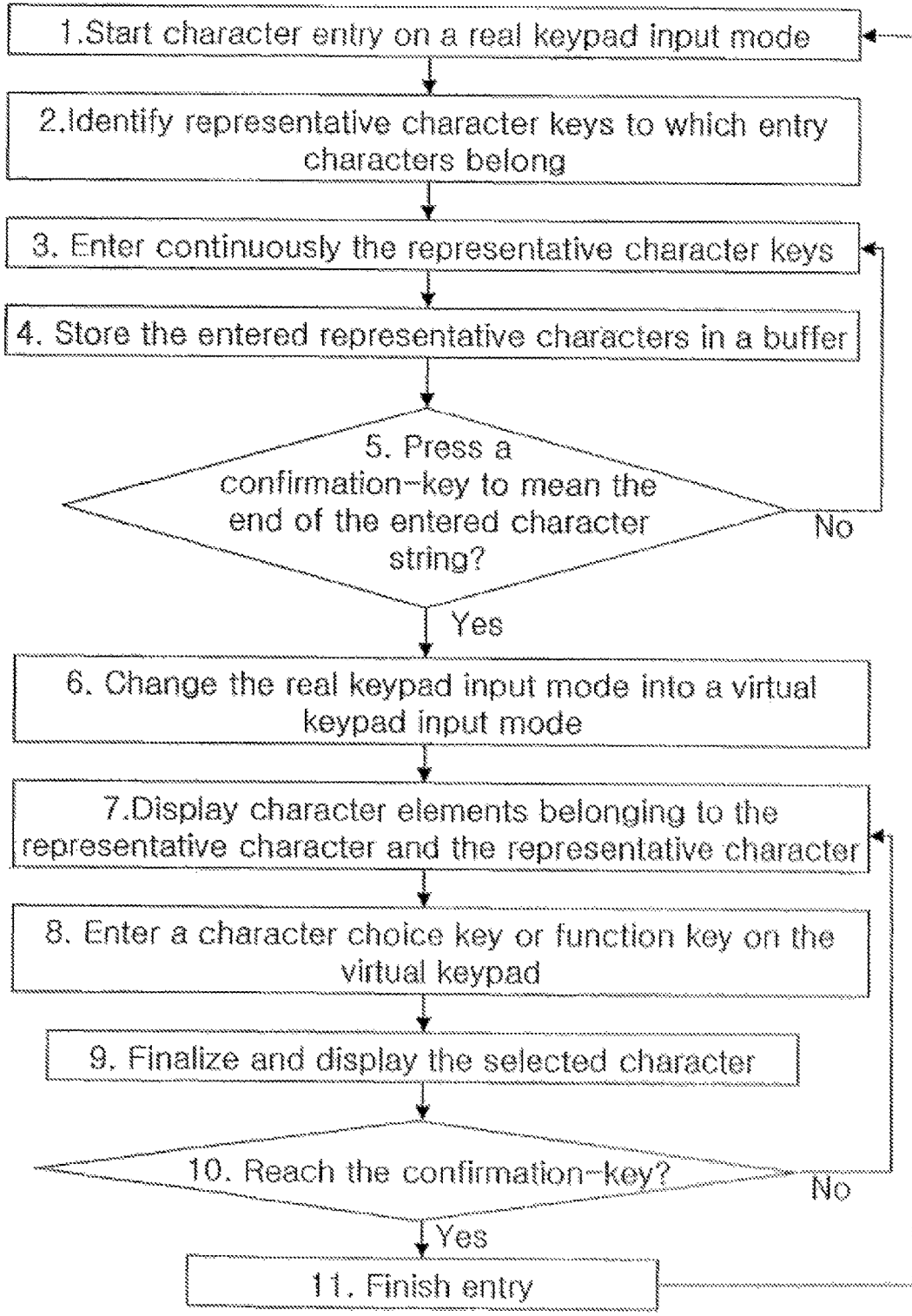
FIG. 3 illustrates a flow chart of Method 2 in accordance with the present invention.

FIG. 3 illustrates a flow chart of another embodiment (hereinafter referred to as "Method 2") of a method for entering characters according to the present invention. While, in Method 1, the basic unit for entering as word is one character, in Method 2, the basic entry unit is multiple characters.

Generally, a user enters 4~5 characters successively as one task. For example, if the user wants to input "boy", he/she recognizes the entire word and understands "boy" as an entry unit. In that case, Method 2 is more effective than Method 1. The processes of Method 2 are similar to those of Method 1 except that Method 2 needs some additive functions due to entry unit of multiple characters. That is, Method 2 includes the process that a set of representative characters entered is stored in an input buffer and the user enters a signal of input completion (or the timer of system is activated by itself). Referring to FIG. 3, in the phase 8, the characters allotted to the representative character key for the character entered first are displayed, and the user selects the desired character according to the above-mentioned process on the virtual keypad input mode. Then, the system displays the characters allotted to the key including the second representative character which is stored in the input buffer, and waits the user's selection input, maintaining the state of the virtual keypad input mode. This process is repeated automatically until the system identifies the key that denotes the end of a set of characters entered successively. Therefore, Method 2 corrects the inconvenience for the user to press the representative character key for each character, and is a suitable method for the typical users.

Figure 4:
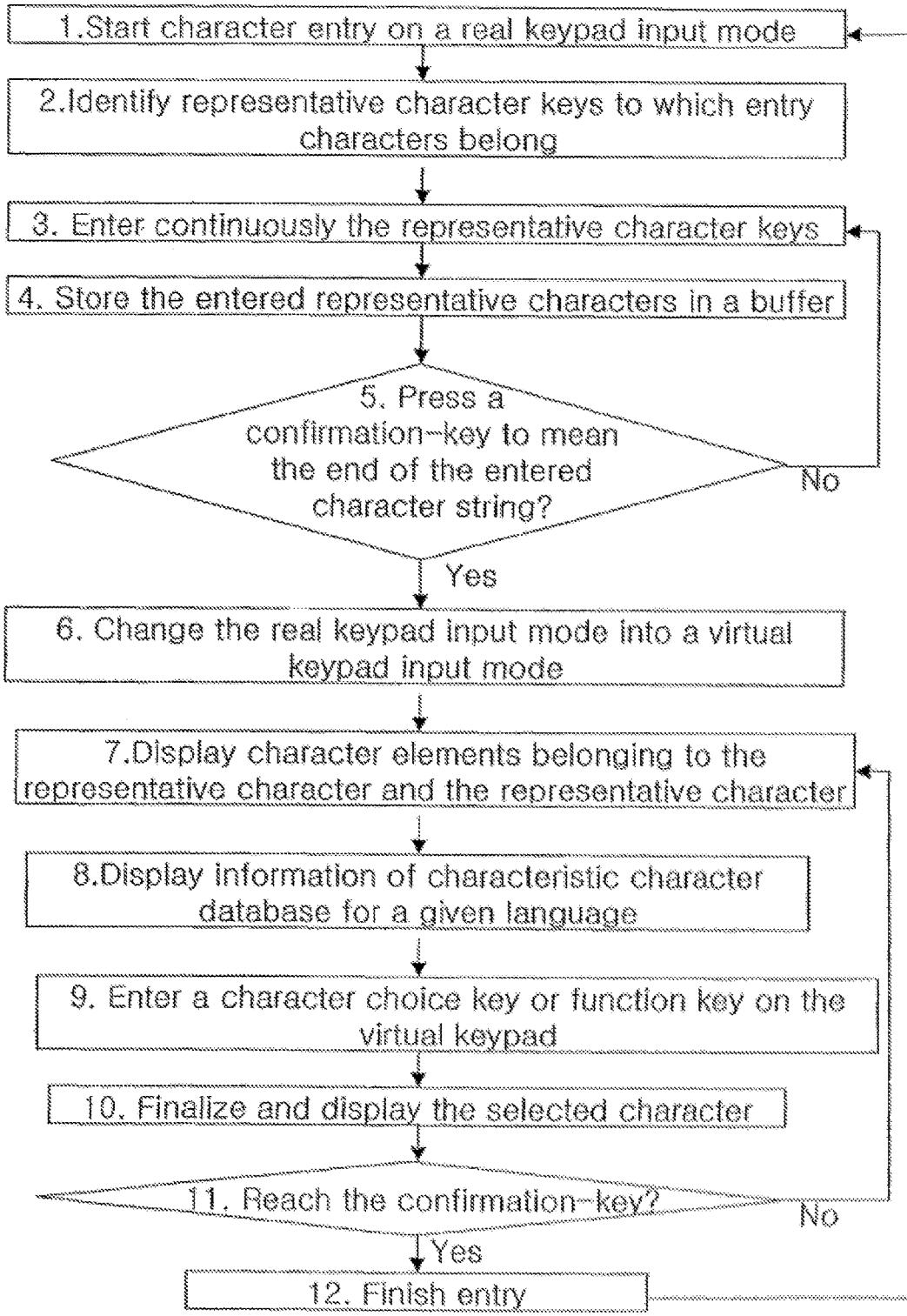
FIG. 4 illustrates a flow chart of Method 3 in accordance with the present invention.

FIG. 4 shows another preferred embodiment (hereinafter referred to as "Method 3") according to the present invention. In general Method 1 and Method 2 have the process in which a user presses representative character keys and the system displays characters allotted to the representative keys. However, by adding the characteristic information of each language to Method 2, it is possible to establish a more intelligent system. Method 3 is a character entry method that the information of character construction collected from a notation system of each language and characteristic information of the notation system are added to Method 1 and Method 2. The detailed description of Method 3 is presented in the embodiments for establishing a character entry system for each language.

Figure 5:
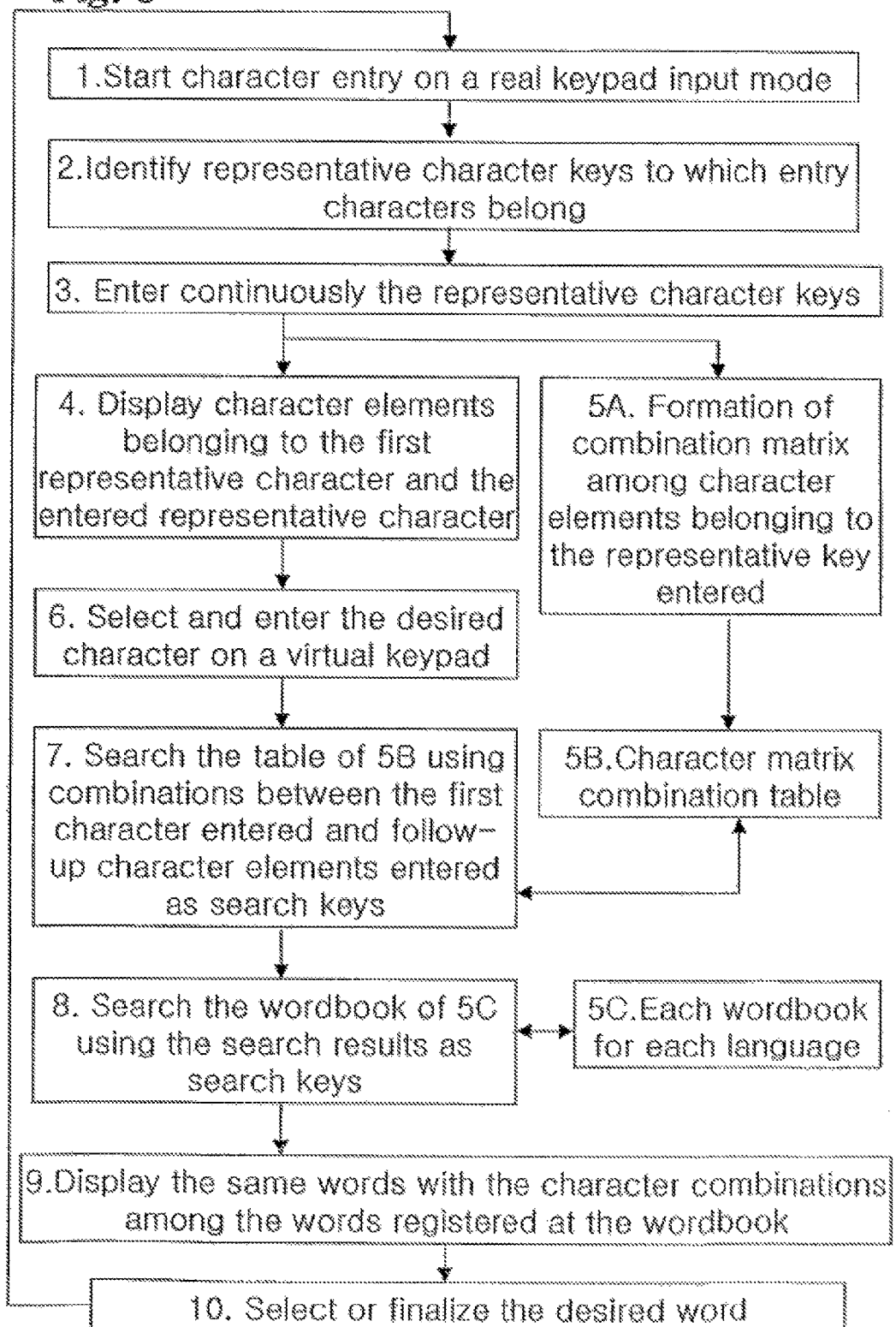
FIG. 5 illustrates a flow chart of Method 4 in accordance with the present invention.

FIG. 5 is another preferred embodiment (hereinafter referred to as "Method 4") according to the present invention. Referring to FIG. 5, the phases 12, 3, 4, and 6 are similar to Method 1, Method 2 and Method 3, and the phases 5A, 5B and 5C are added as new functions instead of phase 4 of Method 2, thereby generating the phases 7, 8, 9 and 10.

Moreover, Method 4 is a suitable method for entering continuously the character entry unit, as a word or a character string, at one time. Specially, in the phase 3 of FIG. 5, the system stores the continuously entered representative characters in the system buffer, and, then, produces combinations of characters allotted to the representative characters to store into a table (phases 5A and 5B).

For example when a user desires to enter "ad" continuously, "A" and "D", the representative characters of "a" and "d" are entered and character combinations between "A, B, and C" belonging to the representative character "A" and "D, E, and F" belonging to the representative character "D" are generated. In other words the produced character combinations are "AD", "AE", "AF", "BD", "BE", "BF", "CD", "CE", and "CF" from entering 2 characters, "a" and "b". This process is fulfilled by the system established according to the present invention. In the mean time, the user selects character "A" from the characters "ABC" belonging to the representative character "A" on the virtual keypad input mode. Then, the system searches the table of character matrix combinations using character "A" as a search key to find character combinations beginning with "A" and displays the resulting character combinations. The resulting character combinations, "AD", "AE,", and "AF" are used again as search keys to search a given dictionary (e.g., English wordbook) in the phase 5C. The system searches the dictionary using these search keys, and displays all the words beginning with "AD", "AE" or "AF". Finally, by selecting the desired word from the displayed words, the user can complete to enter the desired word through a limited number of key presses.

In addition, after entering the character "A", the characters "D, E and F" belonging to the representative character "D" are displayed automatically. If the user selects and enters the character "D", the system displays many words beginning with "AD". As a result, Method 4 of the present invention can diminish the number of words, which is presented in the process of word selection, in the early input stage, compared to the single-tap system of the prior art. Therefore, Method 4 does not interrupt the ideation of the user for character entry process and can reduce a stress accompanied with the character tinny. Another advantage of Method 4 is that in case of entering the words unregistered in a given dictionary, it is more excellent than the existing multi-tap method in respect of input efficiency, input adaptability, and application, because the set of characters entered is inputted.

In the conventional single-tap method, the character combinations among the characters belonging to the representative characters are generated in the phase 3, and a lot of character strings are generated in the phase 8 without phase 4, 5, and 6, using the resulting character combinations. Therefore, the high frequency of dictionary search deteriorates the system performance. However, Method 4 of the present invention can reduce the number of times of dictionary search and the number of the displayed items, by selecting the first character of the desired word in the early stage to reduce the number of character combinations among the characters belonging to the representative characters. Moreover, with the Method 4, a user can easily enter words or character strings unregistered in as given dictionary.

The conventional art uses multi-tap method in order to enter words unregistered in a given dictionary. When a user wants to enter the word "Boy", the conventional multi-tap method needs eight times of key presses; Method 1 or the present invention needs six times of key presses; and Method 2 of the present invention needs four times of key presses.

The preferred embodiments of Method 1, Method 2, Method 3, and Method 4 for various languages will be described in more detail.

First, the preferred embodiment of Method 1 for entering the Latin alphabet is described. In the present invention, the grouping and sets of the Latin alphabetic characters use those on the keypad and key allocation in FIG. 1b, because lots of user are familiar with the character allocation of the keypad in FIG. 1b which is already standardized internationally, and because to group the characters and to designate the representative keys are discretionary.

Method 1 uses the keypad construction of FIG. 1b. To begin with, the definition table for the representative characters and character elements belonging to the representative characters are required. Also, the representative characters to select the characters belonging to the representative characters on a virtual mode and combination rules of numeral keys or function keys are required. Table 1a shows character elements, representative characters, numeral combination keys, and numeral and function combination keys for use in entering the Latin alphabet (English characters).

In Table 1a, the representative characters are index keys to stand for the characters that will be entered; and the numeral combination keys and numeral and function combination keys are used as a entry key to select the desired character among characters displayed on the virtual keypad input mode.

TABLE 1a

| | | Enter key of virtual keypad | |
|---|---|---|---|
| Entry character | Representative character | Numeral combination key | Numeral and function combination key |
| A | A | 1 | 2 |
| B | A | 2 | ↑ |
| C | A | 3 | ↓ |
| D | D | 2 | 3 |
| E | D | 3 | ↑ |
| F | D | 6 | ↓ |
| G | G | 1 | 4 |
| H | G | 4 | ↑ |
| I | G | 7 | ↓ |
| J | J | 4 | 5 |
| K | J | 5 | ↑ |
| L | J | 6 | ↓ |
| M | M | 3 | 6 |
| N | M | 6 | ↑ |
| O | M | 9 | ↓ |
| P | P | 4 | 7 |
| Q | • | 1 | ↑ |
| R | P | 7 | ↑ |
| S | P | 8 | ↓ |
| T | T | 7 | 8 |
| U | T | 8 | ↑ |
| V | T | 9 | ↓ |
| W | W | 6 | 9 |
| X | W | 9 | ↑ |
| Y | W | 8 | ↓ |
| Z | • | 2 | ↓ |

The combination keys used as entry keys on the virtual keypad could be designated in any manner, and each of the combination keys could be altered arbitrarily. The entry combination keys of the present invention are selected considering the relations between the representative diameters and the combination keys and convenience of key entry.

Table 1b shows the character elements, the representative characters and entry keys of the virtual keypad for use in entering the Latin alphabet (European characters). In Table 1b, the representative diameters are index keys to stand for the diameters that will be entered; and the numeral combination keys are used as a entry key to select the desired character among characters displayed on the virtual keypad input mode. The combination keys that used as entry keys in the virtual keypad could be determined in any manner, and each of the combination keys could be altered arbitrarily. The entry combination keys of the present invention are selected considering the relations between the representative characters and combination keys and convenience of key entry.

TABLE 1b

| | | Entry key of virtual keypad |
|---|---|---|
| Entry character | Representative character | Numeral combination key |
| . | | 1 |
| Q | | 2 |
| Z | | 3 |
| A | A | 1 |
| B | | 2 |
| C | | 3 |
| À | | 4 |
| Á | | 5 |
| Â | | 6 |
| Ã | | 7 |

TABLE 1b-continued

| Entry character | Representative character | Entry key of virtual keypad Numeral combination key |
|---|---|---|
| Ä | | 8 |
| À | | 9 |
| Æ | | * |
| C | | 0 |
| D | D | 1 |
| E | | 2 |
| F | | 3 |
| Ð | | 4 |
| È | | 5 |
| É | | 6 |
| Ê | | 7 |
| Ë | | 8 |
| G | G | 1 |
| H | | 2 |
| I | | 3 |
| Ì | | 4 |
| Í | | 5 |
| Î | | 6 |
| Ï | | 7 |
| J | J | 1 |
| K | | 2 |
| L | | 3 |
| M | M | 1 |
| N | | 2 |
| O | | 3 |
| Ñ | | 4 |
| Ò | | 5 |
| Ó | | 6 |
| Ô | | 7 |
| Õ | | 8 |
| Ö | | 9 |
| Ø | | * |
| P | P | 1 |
| R | | 2 |
| S | | 3 |
| ß | | 4 |
| T | T | 1 |
| U | | 2 |
| V | | 3 |
| Ù | | 4 |
| Ú | | 5 |
| Û | | 6 |
| Ü | | 7 |
| Ũ | | 8 |
| W | W | 1 |
| X | | 2 |
| Y | | 3 |
| Ý | | 4 |
| ÿ | | 5 |

Now, methods for entering the word "good" are described, using said representative characters and keys, and representative character and numeral combination keys or function combination keys for use in selecting the desired characters on the virtual keypad input mode.

In accordance with Method 1 (FIG. 2) of the present invention, the user presses "G" key (numeral key 4) because "g" belongs to the representative character "G". At the same time, character elements "G", "H", and "I" belonging to the representative character "G" are displayed and the input mode changes into the virtual keypad input mode. Then, on the virtual keypad input mode, when the user presses "1" key, which corresponds to "G", as the numeral combination key, "G" is finalized and displayed on the screen. In case of using numeral and function combination keys, when the user presses "4" key, "G" is finalized and displayed on the screen. Next, the user presses "M" key (numeral key 6) because "O" belongs to the representative character "M". Subsequently, character elements "M", "N", and "O" belonging to the representative character "M" are displayed and the input mode changes into the virtual keypad input mode. On the virtual keypad input mode, when the user presses "9" key or "↓" key, which corresponds to "O", "O" is finalized and displayed on the screen.

In Method 2 of the present invention, the entry unit is "good". The user presses "G", "M", and "D" keys, the representative keys that correspond to the word "good", continuously, and then, the entry-confirmation key. As shown in FIG. 3, the system stores the set of representative characters entered and displays "G", "H" and "I" belonging to the first representative character "G". At the same-time, the input mode of the system changes into the virtual keypad input mode. When the user identifies and presses the corresponding key referring to the keys defined in the Table 1a, the selected character is finalized and displayed. At the same time the system displays character elements "M", "N", and "O" belonging to the next representative character "M". Subsequently, the above-mentioned processes are carried out identically. After fulfilling the same processes for the representative characters "M" and "N" the character entry is completed.

Figure 6:
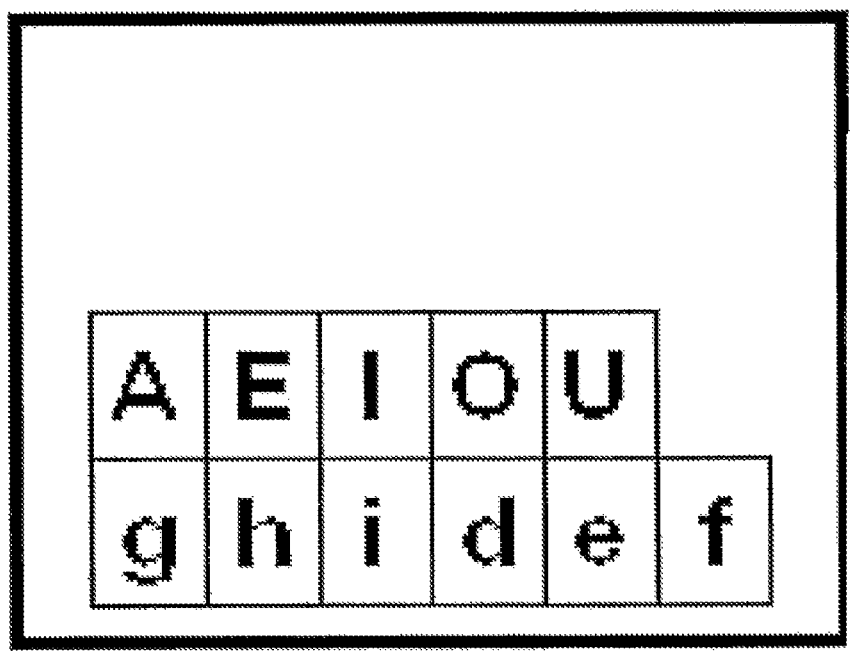
FIG. 6 illustrates an example of English text entry according to the Method 3 of the present invention.

FIG. 6 shows an embodiment of Method 3 according to the present invention. English has a linguistic characteristic that the constitution of word has pattern among 'consonant±vowel', 'vowel+consonant', 'vowel+vowel+consonant', and 'consonant+consonant+vowel'. In addition, all the English words have to include one or more vowels essentially. Method 3 is a method made by combining these linguistic characteristics to Method 1 or Method 2. In Method 3, the user enters only consonant elements as entry characters. In case of entering the word "good", when the user enters the consonant elements "g" and "d", the system, as shown in FIG. 6, displays the six of character elements belonging to the representative characters "G" and "D" at the lower part and the vowels, "A", "I", "U", "E", and "O" at the upper part. Here, the vowels are always displayed at the upper part of the screen. At the same time, the input mode of the system changes into the virtual keypad input mode. Then, the user presses the keys of the virtual keypad shown in FIG. 7 to select "g", "o", "o" and "d".

Thus, with the system displaying always the vowels "A", "I", "U", "E" and "O" on the input mode and displaying the element characters belonging to each of the representative characters at the lower part after entering only the representative characters of the consonants of the desired word, the user can enter efficiently more characters without lowering recognizability and visibility for the displayed characters because the number of characters which the user selects on one virtual keypad input mode increases to about ten. Moreover, by using the combinations between the entered consonant elements and the already displayed vowels, all the possible words can be displayed and the user can select the desired words among them.

Another preferred embodiment according to Method 3 is described. The English words have formative elements used frequently such as the ending of a word and the beginning of a word. Generally, these formative elements have two-character string (e.g., -ch, -sh, -ad, -ac, etc.), three-character string (e.g., -the, -ing, etc.), four-character string (e.g. -tion, etc.) and so on. The database, which is established with the character strings used frequently, can maximize the entry efficiency with a limited number of keys used. There are various declensions in the English language, and, therefore, the database composed of the endings of words such as '-s', '-ed', 'ing', and '-tion' can be established. If as user selects a particular suffix in the database and enters it, he/she can input many characters with a limited number of key presses.

For example, the ending of 'act' can be selected from '-s', '-ed', '-ing', '-ivity', '-ion', and so on. Thus, the database including these suffixes can be established. The user enters "act" and invokes the suffixes for "act" from the database using a function key to display the possible suffixes. The user can select one from these suffixes using a key, and, therefore, he/she can enter all the characters of the suffix through one key entry. Consequently, by including a database composed of these vocabularies into a database of linguistic characteristic information, the input efficiency of English text can be improved considerably. Method 3 can be applied to all the languages identically.

The method for entering the word "good" using Method 4 is described. The method for entering the word "good" according to Method 4 follows similarly the phases 1 to 5 in Method 2 (FIG. 3) or Method 3 (FIG. 4). Because "g" is designated and selected at the first character entry, the character combinations such as "gm", "gn", and "go" are formed due to the representative character "M" of the next character "o". If the user selects "o", "go" is finalized and the system finds the "go" in the formation table. Subsequently, the system searches a given dictionary using "go" as a search key, and displays the words beginning with the "go", such as "go" and "good". Finally, the use selects "good". While the conventional art cannot search the word "good" until the user enters three characters, Method 4 can enter the desired word at the prior step.

The method for establishing an English dictionary for Method 4 is described. In case of computerizing a wordbook, generally, a tree structure is used. The constitution of the dictionary according to the present invention also has a tree structure, as shown in Table 1c.

TABLE 1c

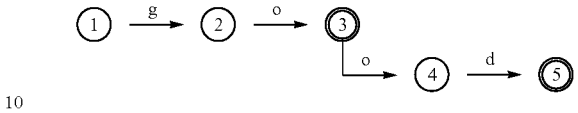

Table 1c shows an example of an entry character string beginning with "g" and "o". If the user enters "go", the system searches a collection of the entire words such as "go" and "good". Such dictionary constitution can search the whole character strings (words) using a limited number of character strings such as the prefix of the desired character string. In addition, it is possible to carry out the edge searches from each node regardless of the number of edges.

Table 1d shows alphabet, representative characters and representative keys, virtual keypad entry keys, and additional entry keys for use in entering tones (five-tone), for entering Vietnamese language according to Method 1, Method 2, Method 3 and Method 4 of the present invention. In Table 1d, the representative characters are index keys to stand for the characters that will be entered, and the numeral combination keys are used as entry keys to select the desired characters from characters displayed on the virtual keypad input mode.

TABLE 1d

| Entry character | Representative character | Entry key of virtual keypad Numeral combination key | Additional entry key (five-tone) | Example of display |
|---|---|---|---|---|
| A | A | 1 | Ó, Ò, ỏ, Õ, ẹ | Á, À, Ả, Ã, Ạ |
| B |   | 2 |   | B |
| C |   | 3 |   | C |
| Â |   | 4 | Ó, Ò, ỏ, Õ, ẹ | Ấ, Ầ, Ẩ, Ẫ, Ậ |
| Ă |   | 5 | Ó, Ò, ỏ, Õ, ẹ | Ắ, Ằ, Ẳ, Ẵ, Ặ |
| D | D | 1 |   | D |
| E |   | 2 | Ó, Ò, ỏ, Õ, ẹ | É, È, Ẻ, Ẽ, Ẹ |
| F |   | 3 |   | F |
| Đ |   | 4 |   | Đ |
| Ê |   | 5 | Ó, Ò, ỏ, Õ, ẹ | Ế, Ề, Ể, Ễ, Ệ |
| G | G | 1 |   | G |
| H |   | 2 |   | H |
| I |   | 3 | Ó, Ò, ỏ, Õ, ẹ | Í, Ì, Ỉ, Ĩ, Ị |
| J | J | 1 |   | J |
| K |   | 2 |   | K |
| L |   | 3 |   | L |
| M | M | 1 |   | M |
| N |   | 2 |   | N |
| O |   | 3 | Ó, Ò, ỏ, Õ, ẹ | Ó, Ò, Ỏ, Õ, Ọ |
| Ô |   | 4 | Ó, Ò, ỏ, Õ, ẹ | Ố, Ồ, Ổ, Ỗ, Ộ |
| Ơ |   | 5 | Ó, Ò, ỏ, Õ, ẹ | Ớ, Ờ, Ở, Ỡ, Ợ |
| P | P | 1 |   | P |
| R |   | 2 |   | R |
| S |   | 3 |   | S |
| T | T | 1 |   | T |
| U |   | 2 | Ó, Ò, ỏ, Õ, ẹ | Ú, Ù, Ủ, Ũ, Ụ |
| V |   | 3 |   | V |
| Ư |   | 4 | Ó, Ò, ỏ, Õ, ẹ | Ứ, Ừ, Ử, Ữ, Ự |
| W | W | 1 |   | W |
| X |   | 2 |   | X |
| Y |   | 3 | Ó, Ò, ỏ, Õ, ẹ | Ý, Ỳ, Ỷ, Ỹ, Ỵ |
| . | . | 1 |   | . |

TABLE 1d-continued

| Entry character | Representative character | Entry key of virtual keypad Numeral combination key | Additional entry key (five-tone) | Example of display |
|---|---|---|---|---|
| Q | | 2 | | Q |
| Z | | 3 | | Z |

The combination keys used as entry keys on the virtual keypad could be determined in any manner, and each of combination keys could be altered arbitrarily. The entry combination keys of the present invention are chosen considering the relations between the representative characters and combination keys and convenience of key entry.

Now, methods for entering Vietnamese language "Điện" are described, in said representative characters and keys, and representative characters and numeral combination keys for use in selecting the desired characters on the virtual keypad input made.

In accordance with the processes of Method 1, as shown in FIG. 2, the user presses the "D" key (numeral key 3) because "Đ." belongs to the representative character "D". At the same time, character elements "D, E, F, Đ., and Ê" belonging to the representative character "D" are displayed and the input mode changes into the virtual keypad input mode. Then, on the virtual keypad input mode, when the user presses "4" key, which corresponds to " Đ.", " Đ." is finalized and displayed on the screen. Next, the user presses "G" key (numeral key 4) because "i" belongs to the representative character "B". Subsequently, character elements "G, H, and I" belonging to "G" are displayed and the input mode changes into the virtual keypad input mode. On the virtual keypad input mode, when the user presses "3" key, which corresponds to "i", "i" is finalized and displayed on the screen. In case of the character "ề", the user enters first 'ê', and then '''. The representative character of 'ê' is "D". When the user presses "D" key (numeral key 3) character elements "D, E, F, Đ., and Ê" belonging to the "D" are displayed and the input mode changes into the virtual keypad input mode. On the virtual keypad input mode, when the user presses "5" key, which corresponds to 'ê', 'ê' is finalized and entered. Subsequently, when the user presses '''' key (numeral key 0), the representative character key of '''', to input a tone marker, tone marker elements " ó ò ỏ õ ọ " belonging to ''' are displayed and the input mode changes into the virtual keypad input mode. On the virtual keypad input mode, when the user presses "2" key, which corresponds to ''', ''' is finalized and entered.

In Method 2 of the present invention, the entry unit is "Điện". The user presses "D", "G", "D", """, and "M" keys, the representative character keys that correspond to "Đ.", "i", "ê", and "n", continuously, and finally an entry-confirmation key. As shown in FIG. 3, the system stores the set of representative characters entered and displays character elements "E, E, F, Đ., and Ê" belonging to the first representative character "D". At the same time, the input mode of the system changes into the virtual keypad input mode. When the user identifies and presses the corresponding key, referring to the keys defined in the Table 1d, the selected character is finalized and entered. At the same time, the system automatically displays "G, H, and I" belonging to the next representative character "G". Subsequently, the above-mentioned processes are carried out identically. After fulfilling the same processes for the next representative diameters "D", """, and "M", the character entry is completed.

In Method 3, it is possible to make an intelligent input system for entering the Vietnamese language by adding knowledge and information related to the Vietnamese language notation system, as shown in FIG. 4. For example, like other language entry, by adding a transition probability table between characters to the system of the present invention, the entry processes are carried out more efficiently. Moreover, the entry efficiency can be improved considerably by using a database including the particular suffixes and prefixes of the Vietnamese language.

The detailed description for Method 4 is omitted because the Vietnamese language entry method according to Method 4 is identical to the above-mentioned English entry method according to Method 4.

Methods for entering Japanese alphabet according to Method 1, Method 2, Method 3, and Method 4 are described. In the present invention, the Japanese character sets and grouping, and designation of representative characters use those in the keypad and key allocation in FIG. 1a, the Japanese standard, because lots of users are familiar with the character allocation of the keypad in FIG. 1a. However, this keypad constitution is intended to be illustrative and not to be construed as limiting the scope of the present invention.

In Method 1, to begin with, the definition table for the representative characters and character elements belonging to the representative characters are described. Also, the representative characters to select the characters belonging to the representative characters on the virtual mode, and combination rules of numeral keys are required. Table 2 shows character elements, representative characters, and numeral combination keys for use in entering the Japanese alphabet. In Table 2, the representative characters are index keys to stand for the characters that will be entered, and the numeral combination keys are used as entry keys to select the desired characters from the diameters displayed on the virtual keypad input mode. The combination keys used as entry keys on the virtual keypad could be determined in any manner, and each of combination keys could be altered arbitrarily. The entry combination keys of the present invention are chosen considering the relations between the representative characters and combination keys, and convenience of key entry.

TABLE 2

| | | Entry key at virtual keypad | |
|---|---|---|---|
| Entry character | Representative character | Numeral combination key | Numeral and function combination key |
| あ | あ | 1 | |
| い | | 2 | |
| う | | 3 | |

TABLE 2-continued

| | | Entry key at virtual keypad | |
|---|---|---|---|
| Entry character | Representative character | Numeral combination key | Numeral and function combination key |
| あ | | 4 | |
| い | | 5 | |
| か | か | 1 | |
| き | | 2 | |
| く | | 3 | |
| け | | 4 | |
| こ | | 5 | |
| さ | さ | 1 | |
| し | | 2 | |
| す | | 3 | |
| せ | | 4 | |
| そ | | 5 | |
| た | た | 1 | |
| ち | | 2 | |
| つ | | 3 | |
| て | | 4 | |
| と | | 5 | |
| な | な | 1 | |
| に | | 2 | |
| ぬ | | 3 | |
| ね | | 4 | |
| の | | 5 | |
| は | は | 1 | |
| ひ | | 2 | |
| ふ | | 3 | |
| へ | | 4 | |
| ほ | | 5 | |
| ま | ま | 1 | |
| み | | 2 | |
| む | | 3 | |
| め | | 4 | |
| も | | 5 | |
| や | や | 1 | |
| ゆ | | 2 | |
| よ | | 3 | |
| ら | ら | 1 | |
| り | | 2 | |
| る | | 3 | |
| れ | | 4 | |
| ろ | | 5 | |
| わ | わ | 1 | |
| を | | 2 | |
| ん | | 3 | |

Now methods for entering the Japanese Language "よし" are described, using said representative characters and keys, and representative characters and numeral combination keys for selecting the desired characters on the virtual keypad input mode.

In accordance with the processes of FIG. 2, the user presses "や" key (numeral key 8) because "よ" belongs to the representative character "や". At the same time, character elements "や, ゆ, and よ" and belonging to the representative character "や" are displayed and the input mode changes into the virtual keypad input mode. On the virtual keypad input mode, when the use presses "3" key, which corresponds to "よ", "よ" is finalized and entered. Next, the user presses "さ" key (numeral key 3) because "し" belongs to the representative character "さ". Subsequently, character elements "さ, し, す, せ, and そ" belonging to the representative character "さ" are displayed and the input mode changes into the virtual keypad input mode. On the virtual keypad input mode, when the user presses "2" key, which corresponds to "し", "し" is finalized and entered. To enter "よし" according to the multi-tap method needs five times of key entry, but Method 1 of the present invention needs only four times of key entry.

In Method 2, the entry unit is "よし". Therefore, the user presses "や" and "さ", the representative character keys that correspond to "よ" and "し", continuously, and finally the entry-confirmation key. As shown in FIG. 3, the system stores the set of representative characters entered and displays "や, ゆ, and よ" belonging to the first representative character "や". At the same time, the input mode of the system changes into the virtual keypad input mode. When the user identifies and presses the corresponding key, referring to the keys defined in the Table 2, the selected character is finalized and entered. At the same time, the system automatically displays "さ, し, す, せ, and そ" belonging to the next representative character "さ". Subsequently, the above-mentioned processes are carried out identically. After fulfilling the same processes for all the representative characters entered, the character entry is completed.

The entry process of "よし" according to Method 3 is described. In the Japanese character entry, when considering features of Japanese language notation system as knowledge and information for use in Method 3, there is a transition probability between characters. In other words, if Method 3 of the present invention introduces the probability table which includes, for example, the information about the next possible characters following "よ", it is possible to establish a more intelligent Japanese alphabet entry system. For example, the most possible character among all the characters of "さ" column following "よ" can be displayed in a special way. In addition, as described in the English entry method, the frequently used formative elements such as "よし" and "です" can be established as a database and added into the database of Japanese linguistic characteristic information, and thereby the input efficiency of the Japanese language can be improved considerably.

The detailed description for Method 4 is omitted because the Japanese language entry method according to Method 4 is identical to the above-mentioned English entry method according to Method 4.

Methods for entering the Russian language according to Method 1, Method 2, Method 3, and Method 4 are described. In the present invention, the Russian alphabetic character sets and grouping, and designation of representative characters use those in the keypad and key allocation in FIG. 8.

In accordance with the processes of Method 1, as shown in FIG. 2, first, the definition table for the representative characters and character elements belonging to the representative characters are required. Also, the representative characters to select the characters belonging to the representative characters on the virtual mode, and combination rules of numeral keys or function keys are required. Table 3 shows character elements, representative characters, numeral combination keys and numeral and function combination keys for entering the Russian alphabet. In Table 3, the representative characters are index keys to stand for the characters that will be entered, and the numeral combination keys or numeral and function combination keys are used as entry keys to select the desired characters from the characters displayed on the virtual keypad input mode.

TABLE 3

| Entry character | Representative character | Entry key of virtual keypad | | Entry character | Representative character | Entry key of virtual keypad | |
|---|---|---|---|---|---|---|---|
| | | Numeral combination key | Numeral and function combination key | | | Numeral combination key | Numeral and function combination key |
| A | A | 1 | 1 | P | P | 6 | 6 |
| Б | | 2 | * | C | | 5 | * |
| В | | 8 | # | T | | 4 | # |
| Г | Г | 2 | 2 | У | У | 7 | 7 |
| Д | | 5 | * | Ф | | 8 | * |
| К | | 8 | # | X | | 9 | # |
| Е | | 0 | ## | У | У | 8 | 8 |
| Ж | Ж | 3 | 3 | C | | 0 | * |
| З | | 2 | * | Ш | | 2 | # |
| И | | 1 | # | Щ | | 5 | ## |
| й | | 6 | ## | Э | Э | 9 | 9 |
| К | К | 4 | 4 | Ю | | 8 | * |
| Л | | 5 | * | Я | | 7 | # |
| М | | 6 | # | ь | ь | 0 | 0 |
| Н | Н | 5 | 5 | ы | | 2 | * |
| О | | 8 | * | Ъ | | 5 | # |
| П | | 0 | # | | | | |

In Table 3, the combination keys used as entry keys on the virtual keypad could be determined in any manner, and each of combination keys could be altered arbitrarily. The entry combination keys of the present invention are chosen considering the relations between the representative characters and combination keys, and convenience of key entry.

Now, methods for entering the Russian language "РУСС КИИ" are described, using said representative characters and keys, and representative characters and numeral combination keys or numeral and function combination keys for use in selecting the desired characters on the virtual keypad input mode.

In accordance with the processes of Method 1, as shown in FIG. 2, the user presses "P" key (numeral key 6) because "P" belongs to the representative character "P". At the same time, character elements "P", "C", and "T" belonging to the representative character "P" are displayed and the input mode changes into the virtual keypad input mode. On the virtual keypad input mode, when the user presses "6" key, which corresponds to "P", "P" is finalized and entered. In case of using numeral and function combination keys, when the user presses "6" key, which corresponds to "P", "P" is finalized and entered. Next, the user presses "Y" key (numeral key 7) because "Y" belongs to the representative character "Y". At the same time, character elements "Y", "Ф" and "X" belonging to the representative character "Y" are displayed and the input mode changes into the virtual keypad input mode. On the virtual keypad input mode, when the user presses "7" key, which corresponds to "Y", "Y" is finalized and entered. After fulfilling the same processes for "C", "C", "К", "И" and "И", the character entry is completed.

In Method 2 of the present invention, the entry unit is "РУССКИИ". The user presses "P", "Y", "P", "P", "К", "Ж", and "Ж", the representative characters keys that correspond to "P", "Y", "C", "C", "К", "И", and "И", continuously, and finally the entry-confirmation key. As shown in FIG. 3, the system stores the set of representative characters entered and displays character elements "P","C", and "T" belonging to the first representative character "P". At the same time, the input mode of the system changes into the virtual keypad input mode. When the user identifies and presses the corresponding key, referring to the keys defined in the Table 3, the selected character is finalized and entered. At the same time, the system automatically displays character elements "Y", "Ф" and "X" belonging to the representative character "Y". Subsequently, the above-mentioned processes are carried out identically. After fulfilling the same processes for the representative characters "C", "C", "К", "И", and "И", the character entry is completed.

In Method 3, it is possible to make an intelligent input system for entering the Russian language by adding the knowledge and information related to the Russian language notation system, as shown in FIG. 4. For example, like other language entry, by adding the transition probability table between characters to the system of the present invention, the entry processes are carried out more efficiently. Moreover, the entry efficiency can be improved considerably by using a database including the particular suffixes and prefixes of the Russian language.

The detailed description for Method 4 is omitted because the Russian language entry method according to Method 4 is identical to the above-mentioned English entry method according to Method 4.

Methods for entering Arabic alphabet according to Method 1, Method 2, Method 3, and Method 4 are described. In the present invention, the Arabic character sets and grouping, and designation of representative characters use those in the keypad and key allocation in FIG. 9.

In accordance with the processes of Method 1, as shown in FIG. 2, first, the definition table for the representative characters and character elements belonging, to the representative characters are required. Also, the representative characters to select the characters belonging to the representative characters on the virtual mode, and combination rules of numeral keys are required. Table 4 shows character elements, representative characters, numeral combination keys, and function combination keys for use in entering the Arabic characters.

TABLE 4

| Entry character | Representative character | Numeral combination key | Numeral and function combination key | Entry character | Representative character | Numeral combination key | Numeral and function combination key | Entry character | Representative character | Numeral combination key | Numeral and function combination key |
|---|---|---|---|---|---|---|---|---|---|---|---|
| | | | | ط | ط | 1 | | و | و | 1 | |
| | | | | ظ | | 2 | | ؤ | | 2 | |
| | | | | ع | | 3 | | ى | | 3 | |
| | | | | غ | | 4 | | ي | | 4 | |
| | | | | | | | | ئ | | 5 | |
| | | | | | | | | ء | | 6 | |
| ح | ح | 1 | | س | س | 1 | | م | م | 1 | |
| ح | | 2 | | ش | | 2 | | ن | | 2 | |
| خ | | 3 | | ص | | 3 | | ه | | 3 | |
| | | | | ض | | 4 | | ة | | 4 | |
| ا | ا | 1 | | د | د | 1 | | و | و | 1 | |
| أ | | 2 | | ذ | | 2 | | ؤ | | 2 | |
| ا | | 3 | | ر | | 3 | | ك | | 3 | |
| آ | | 4 | | ز | | 4 | | ل | | 4 | |
| ب | | 5 | | | | | | | | | |
| ت | | 6 | | | | | | | | | |
| ث | | 7 | | | | | | | | | |

In Table 4, the representative characters are index keys to stand for the characters that will be entered, and the numeral combination keys are used as entry keys to select the desired characters from the characters displayed on the virtual keypad input mode. In Table 4, the combination keys used as entry keys on the virtual keypad could be determined in any manner, and each of combination keys could be altered arbitrarily. The entry combination keys of the present invention are chosen considering the relations between the representative characters and combination keys, and convenience of key entry.

Now, methods for entering the Arabic language " " are described, using said representative characters and keys, and representative characters and numeral combination keys for selecting the desired characters on the virtual keypad input mode.

In accordance with the processes of Method 1, as shown in FIG. 2, the user presses " " key (numeral key 7) because " " belongs to the representative character " ". At the same time, character elements " ", " ", " ", " ", " ", and " " belonging to the representative character " " are displayed and the input mode changes into the virtual keypad input mode. On the virtual keypad input mode, when the user presses "1" key, which corresponds to " ", " " is finalized and entered. After fulfilling the same processes for the next characters " " and " ", the character entry is completed.

In Method 2 of the present invention, the entry unit is " ". The user presses " ", " ", and " ", the representative character keys that correspond to " ", " ", and " ", continuously, and finally the entry-confirmation key. As shown in FIG. 3, the system stores the set of representative characters entered and displays character elements " ", " ", " ", " ", " ", and " " belonging to the representative character " ". At the same time the input mode of the system changes into the virtual keypad input mode. When the user identifies and presses the corresponding key, referring to the keys defined in the Table 4, the selected character is finalized and entered. At the same time, the system automatically displays character elements " ", " ", " ", and " " belonging to the representative character " ". Subsequently, the above-mentioned processes are carried out identically. After fulfilling the same processes for the representative character " ", the character entry is completed.

In Method 3, it is possible to make an intelligent input system for entering the Arabic language by adding the knowledge and information related to the Arabic language notation system, as shown in FIG. 4. For example, like other language entry, by adding a transition probability table between characters to the system of the present invention, the entry processes are carried out more efficiently. Moreover, the entry efficiency can be improved considerably by using a database including the particular suffixes and prefixes of the Arabic language.

The detailed description for Method 4 is omitted because the Arabic language entry method according to Method 4 is identical to the above-mentioned English entry method according to Method 4.

Methods for entering the Hebraic character according to Method 1, Method 2, Method 3, and Method 4 are described. In the present invention, the Hebraic character sets and grouping, and designation of representative characters use those in the keypad and key allocation in FIG. 10.

In accordance with the processes of Method 1, as shown in FIG. 2, first, the definition table for the representative characters and character elements belonging to the representative characters are required. Also, the representative characters to select the characters belonging to the representative character keys on the virtual mode, and combination rules between numeral keys or between function keys are required. Table 5 shows character elements, representative characters, numeral combination keys, and function combination keys for use in entering the Hebraic character.

TABLE 5

| Entry character | Representative character | Numeral combination key | Numeral and function combination key | Entry character | Representative character | Numeral combination key | Numeral and function combination key | Entry character | Representative character | Numeral combination key | Numeral and function combination key |
|---|---|---|---|---|---|---|---|---|---|---|---|
| ו ו | ו ו | 1 | 1 | ט | ט | 1 | 1 | ד | ד | 1 | 1 |
| וֹ | | 2 | * | ם | | 2 | * | ש | | 2 | * |
| וו | | 3 | # | כ | | 3 | # | ת | | 3 | ** |
| | | | | ן | | 4 | ## | שׁ | | 4 | # |
| | | | | | | | | שׂ | | 5 | ## |
| | | | | | | | | ת | | 6 | ### |
| ד | ד | 1 | 1 | י | י | 1 | 1 | צ | צ | 1 | 1 |
| ה | | 2 | * | ג | | 2 | * | ע | | 2 | * |
| ז | | 3 | # | ר | | 3 | # | ק | | 3 | # |
| | | | | ל | | 4 | ## | | | | |
| | | | | כּי | | 5 | ### | | | | |
| | | | | ב | | | | | | | |
| א | א | 1 | 1 | ו | ו | 1 | 1 | ס | ס | 1 | 1 |
| כ | | 2 | * | ח | | 2 | * | ע | | 2 | * |
| ג | | 3 | # | ע | | 3 | # | פ | | 3 | # |
| פ | | 4 | ## | | | | | ף | | 4 | # |
| | | | | | | | | ר | | 5 | ### |

In Table 5, the representative characters are index keys to stand the characters that will be entered, and the numeral combination keys are used as entry keys to select the desired character from the characters displayed on the virtual keypad input mode. In Table 5, the combination keys used as entry keys on the virtual keypad could be determined in any manner, and each of combination keys could be altered arbitrarily. The entry combination keys of the present invention are chosen considering the relations between the representative characters and combination keys, and convenience of key entry.

Now, methods for entering the Hebraic language "באם" are described, using said representative characters and keys, and representative characters and numeral combination keys or function combination keys for selecting the desired characters on the virtual keypad input mode.

In accordance with the processes of Method 1, as shown in FIG. 2, the user presses """ key (numeral key 5) because "ב" belongs to the representative character """. At the same time, character elements """, "ב", "ו", "ל", and "ב" belonging to the representative character are displayed and the input mode changes into the virtual keypad input mode. On the virtual keypad input mode, when the user presses "5" key, which corresponds to "ב", "ב" is finalized and entered. In case of using numeral and function combination keys, when the user presses "#" key three times, "ב" is finalized and entered. Next, the user presses "מ" key (numeral key 4) because "מ" belongs to the representative character "מ". Subsequently, character elements "מ", "מ", "נ", and "ך" belonging to the representative character "מ" are displayed and the input mode changes into the virtual keypad input mode. On the virtual keypad input mode, when the user presses "2" or "*" key, which corresponds to "מ", "מ" is finalized and entered. After fulfilling the same processes for next character "א", the character entry is completed.

In Method 2 of the present invention, the entry unit is "באם". The user presses """, "מ", and "א", the representative characters keys that correspond to "ב", "מ", and "א", continuously, and finally the entry-confirmation key. As shown in FIG. 3, the system stores the set of representative characters entered and displays character elements """, "ב", "ו", "ל", and "ב" belonging to the first representative character """. At the same time, the input mode of the system changes into the virtual keypad input mode. When the user identifies and presses the corresponding key, referring to the keys defined in the Table 5, the selected character is finalized and entered. At the same time, the system automatically displays character elements "מ", "מ", "נ", and "ך" belonging to the next representative character " ". Subsequently, the above-mentioned processes are carried out identically. After fulfilling the same processes for the last representative character "א", the character entry is completed.

In Method 3, it is possible to make an intelligent input system for entering the Hebraic language by adding the knowledge and information related to the Hebraic language notation system as shown in FIG. 4. For example, like other language entry according to Method 3 of the present invention by adding a transition probability table between characters to the system the present invention, the entry processes are carried out more efficiently. Moreover, the entry efficiency can be improved considerably by using a database including the particular suffixes and prefixes of the Hebraic language.

The detailed description for Method 4 is omitted because the Hebraic language entry method according to Method 5 is identical to the above-mentioned English entry method according to Method 4.

Methods for entering the Thai character according to Method 1, Method 2, Method 3, and Method 4 are described. In the present invention, the Thai character sets and grouping, and designation of representative characters use those in the keypad and key allocation in FIG. 11.

TABLE 6

| Entry character | Representative character | Numeral combination key | Numeral and function combination key |
|---|---|---|---|
| ก | ก | 1 | |
| ข | | 2 | |
| ฅ | | 3 | |
| ฆ | | 4 | |
| ง | | 5 | |
| จ | | 6 | |
| ฉ | | 7 | |
| ช | ช | 1 | |
| ซ | | 2 | |
| ฌ | | 3 | |
| ญ | | 4 | |
| ฎ | | 5 | |
| ฏ | | 6 | |
| ฐ | | 7 | |
| ฑ | ฑ | 1 | |
| ฒ | | 2 | |
| ณ | | 3 | |
| ด | | 4 | |
| ต | | 5 | |
| ถ | | 6 | |
| ท | | 7 | |
| ธ | ธ | 1 | |
| น | | 2 | |
| บ | | 3 | |
| ป | | 4 | |
| ผ | | 5 | |
| ฝ | | 6 | |
| พ | | 7 | |
| ฟ | ฟ | 1 | |
| ภ | | 2 | |
| ม | | 3 | |
| ย | | 4 | |
| ร | | 5 | |
| ล | | 6 | |
| ว | | 7 | |
| ศ | ศ | 1 | |
| ษ | | 2 | |
| ส | | 3 | |
| ห | | 4 | |
| ฬ | | 5 | |
| อ | | 6 | |
| ฮ | | 7 | |
| เ | เ | 1 | |
| แ | | 2 | |
| โ | | 3 | |
| ใ | | 4 | |
| ไ | | 5 | |
| ๅ | | 6 | |
| ๆ | | 7 | |
| ิ | ิ | 1 | |
| ี | | 2 | |
| ึ | | 3 | |
| ื | | 4 | |
| ุ | | 5 | |
| ู | | 6 | |
| ั | | 7 | |
| ็ | | 8 | |
| ์ | | 9 | |
| ำ | ำ | 1 | |
| า | | 2 | |
| ะ | | 3 | |
| ฯ | | 4 | |

TABLE 6-continued

| Entry character | Representative character | Numeral combination key | Numeral and function combination key |
|---|---|---|---|
| อํ | | 5 | |
| ๋ | | 6 | |
| ่ | | 7 | |
| ้ | | 8 | |
| ๐ | ๐ | 1 | |
| ๑ | | 2 | |
| ๒ | | 3 | |
| ๓ | | 4 | |
| ๔ | | 5 | |

In accordance with the process of Method 1, as shown in FIG. 2, first, the definition table for the representative characters and character elements belonging to the representative characters are required. Also, the representative characters for selecting the character belonging to the representative character keys on the virtual mode, and combination rules between numeral keys are required. Table 6 shows character elements, representative characters and numeral combination keys for use in entering the Thai character. In Table 6 the representative characters are index keys to stand for the characters that will be entered, and the numeral combination keys are used as entry keys to select the desired particular characters from the characters displayed on the virtual keypad input mode. In Table 6, the combination keys used as entry keys on the virtual keypad could be determined in any manner, and each of combination keys could be altered arbitrarily. The entry combination keys of the present invention are chosen considering the relations between the representative characters and combination to keys, and convenience of key entry.

Now, methods for entering the Thai language " ไทย " are described, using said representative characters and keys, and representative characters and numeral combination keys for selecting the desired characters on the virtual keypad input mode.

In accordance with the processes of Method 1, as shown in FIG. 2, the user presses " เ " key (numeral key 7) because " ไ " belongs to the representative character " เ ". At the same time, character elements " เ แ โ ใ ไ ๅ ๆ " belonging to the representative character " เ " are displayed and the input mode changes into the virtual keypad input mode. On the virtual keypad input mode, when the user presses "1" key, which corresponds to " ไ ", " ไ " is finalized and entered. Next, the used presses " ฟ " key (numeral key 5) because " ท " belongs to the representative character " ฟ ". Subsequently, character elements " ฟภมยรลว " belonging to the representative character " ฟ " are displayed and the input mode changes into the virtual keypad input mode. On the virtual keypad input mode, when the user presses " 5 " key, which corresponds to " ท ", " ท " is finalized and entered. Finally, the user presses " ำ " key (numeral key 9) because " ย " belongs to the representative character " ำ ". Subsequently, character elements " ำาะฯอํ๋่้ " belonging to the representative character " ำ " are displayed and the input mode changes into the virtual keypad input mode. On the virtual keypad input mode, when the user presses "3" which corresponds to " ย ", " ย " is finalized and entered.

In Method 2 of the present invention, the entry unit is "เก". The user presses "เ", "ก", and "า", the representative character keys that correspond to "เกา", continuously, and finally the entry-combination key. As shown in FIG. 3, the system stores the set of representative characters entered and displays character elements " " belonging to the first representative character 'เ'. At the same time, the input mode of the system changes into the virtual keypad input mode. When the user identifies and presses the corresponding key, referring to the keys defined in the Table 6, the selected character is finalized and entered. At the same time, the system automatically displays character elements " " belonging to the next representative character "ก". Subsequently, the above-mentioned processes are carried out identically. After fulfilling, the same processes for the last representative character "า", the character entry is completed.

In Method 3, it is possible to make an intelligent input system for entering the Thai language by adding the knowledge and information related to the Thai language notation system, as shown in FIG. 4. For example, like other language entry according to Method 3 of the present invention, by adding a transition probability table between characters to the system of the present invention, the entry processes are carried out more efficiently. Moreover, the entry efficiency can be improved considerably by using a database including the particular suffixes and prefixes of the Thai language.

The detailed description for Method 4 is omitted because the Thai language entry method according to Method 4 is identical to the above-mentioned English entry method according to Method 4.

Methods for entering the Devanagari character according to Method 1, Method 2, Method 3, and Method 4 are described. In the present invention, the Devanagari character sets and grouping, and designation of representative characters use those in the keypad and key allocation in FIG. 12.

In accordance with the processes of Method 1, as shown in FIG. 2, first, the definition table for the representative characters and character elements belonging to the representative characters are required. Also, the representative characters for selecting the characters belonging to the representative character keys on the virtual mode, and combination rules between numeral keys are required. Table 7-1 and 7-2 show character elements, representative characters, and numeral combination keys for use in entering the Devanagari letter. In Table 7-1 and 7-2, the representative characters are index keys to stand for the characters that will be entered, and the numeral combination keys are used as entry keys to select the desired character from the characters displayed on the virtual keypad input mode. In Table 7-1 and 7-2, the combination keys used as entry keys on the virtual keypad could be determined in any manner, and each of combination keys could be altered arbitrarily. The entry combination keys of the present invention are chosen considering the relations between the representative characters and combination keys and convenience of key entry.

TABLE 7-1

| Entry character | Representative character | Entry key of virtual keypad | |
|---|---|---|---|
| | | Numeral combination key | Numeral and function combination key |
| क | क | 1 | |
| ख | | 2 | |

TABLE 7-1-continued

| Entry character | Representative character | Entry key of virtual keypad | |
|---|---|---|---|
| | | Numeral combination key | Numeral and function combination key |
| ग | | 3 | |
| घ | | 4 | |
| ङ | | 5 | |
| च | च | 1 | |
| छ | | 2 | |
| ज | | 3 | |
| झ | | 4 | |
| ञ | | 5 | |
| ट | ट | 1 | |
| ठ | | 2 | |
| ड | | 3 | |
| ढ | | 4 | |
| ण | | 5 | |
| ड़ | | 6 | |
| ढ़ | | 7 | |
| ड़ | | 8 | |
| ढ़ | | 9 | |
| त | त | 1 | |
| थ | | 2 | |
| द | | 3 | |
| ध | | 4 | |
| न | | 5 | |
| प | प | 1 | |
| फ | | 2 | |
| ब | | 3 | |
| भ | | 4 | |
| म | | 5 | |
| य | य | 1 | |
| र | | 2 | |
| ल | | 3 | |
| व | | 4 | |
| श | | 5 | |
| ॐ | | 6 | |
| ओ | ओ | 1 | |
| औ | | 2 | |
| ऋ | | 3 | |

TABLE 7-2

| Entry character | Representative character | Entry key of virtual keypad | |
|---|---|---|---|
| | | Numeral combination key | Numeral and function combination key |
| ष | ष | 1 | |
| स | | 2 | |
| ह | | 3 | |
| क्ष | | 4 | |
| त्र | | 5 | |
| ज्ञ | | 6 | |
| श्र | | 7 | |
| अ | अ | 1 | |
| आ | | 2 | |
| इ | | 3 | |
| ई | | 4 | |
| उ | | 5 | |
| ऊ | | 6 | |
| ए | | 7 | |
| ऐ | | 8 | |
| ञ | ञ | 1 | |
| ौ | | 2 | |
| ॊ | | 3 | |
| ॉ | | 4 | |
| ि | | 5 | |
| ॒ | | 6 | |
| ॑ | | 7 | |

TABLE 7-2-continued

| Entry character | Representative character | Numeral combination key | Numeral and function combination key |
|---|---|---|---|
| ॄ | | 8 | |
| ॅ | | 9 | |
| ॆ | | 0 | |
| ॉ | ॄ | 1 | |
| ॊ | | 2 | |
| ॎ | | 3 | |
| ः | | 4 | |
| ँ | | 5 | |
| ं | | 6 | |
| ऺ | | 7 | |

Now, methods for entering the Devanagari language ध्रम्(ध+्+र+ॆ+म) are described, using said representative characters and keys, and representative characters and numeral combination keys for selecting the desired characters on the virtual keypad input mode.

In accordance with the processes of Method 1, as shown in FIG. 2, the user presses "ध" key (numeral key 5) because "ध" belongs to the representative character "ध". At the same time, character elements "ध, फ, ब, भ, म" belonging to the representative character "ध" are displayed and the input mode changes into the virtual keypad input mode. On the virtual keypad input mode, when the user presses "1" key, which corresponds to "ध", "ध" is finalized and entered. Next, the user presses "्" key (function key *) because "्" belongs to the representative character "्". Subsequently, character elements "ु ू ृ ॄ ॅ ॆ ॉ ॊ ॎ ः ँ ं" belonging to the representative character "्" are displayed and the input mode changes into the virtual keypad input mode. On the virtual keypad input mode, when the user presses "1" key, which corresponds to "्", "्" is finalized and entered. After fulfilling the same processes for next characters "र,ॆ,म", the character entry is completed.

In Method 2 of the present invention, the entry unit is ध्रम्(ध+्+र+ॆ+म). The user presses "ध","्","र","ॆ", and "म", the representative character keys that correspond to "ध्रम्(ध+्+र+ॆ+म)", continuously, and finally the entry-confirmation key. As shown in FIG. 3, the system stores the set of representative characters entered and displays character elements "ध, फ, ब, भ, म" belonging to the first representative character "ध". At the same time, the input mode of the system changes into the virtual keypad input mode. When the user identifies and presses the corresponding key, referring to the keys defined in the Table 7-1 and 7-2, the selected character is finalized and entered. At the same time, the system automatically displays character elements "ु ू ृ ॄ ॅ ॆ ॉ ॊ ॎ ः ँ ं" belonging to the next representative character "्". Subsequently, the above-mentioned processes are carried out identically. After fulfilling the same processes for the representative characters "ध", "्", and "ध", the character entry is completed.

In Method 3, it is possible to make an intelligent input system for entering the Devanagari language by adding the knowledge and information related to the Devanagari letter notation system, as shown in FIG. 4. For example, like other language entry according to Method 3 of the present invention, by adding a transition probability table between characters to the system of the present invention, the entry processes are carried out more efficiently. Moreover, the entry efficiency can be improved considerably by using a database including the particular suffixes and prefixes of the Devanagari language.

The detailed description for Method 4 is omitted because the Devanagari letter entry method according to Method 4 is identical to the above-mentioned English entry method according to Method 4.

Methods for entering the Chinese characters according to Method 1, Method 2, Method 3, and Method 4 are described. In the present invention, the Chinese characters are grouped using the information of the conventional Chinese character notation system. Conventionally, in entering or searching the Chinese characters by means of a computer, strokes, radicals (multi-stroke character sub-element) and the information of character form are used as the information for entering Chinese characters, 5~8 strokes in number, 222 radicals in number, and 14 ( ) character forms in number are basically used.

Figure 13:
FIG. 13 illustrates a depiction of a cellular telephone having a keypad for Chinese character entry in accordance with the present invention.
Figure 14:
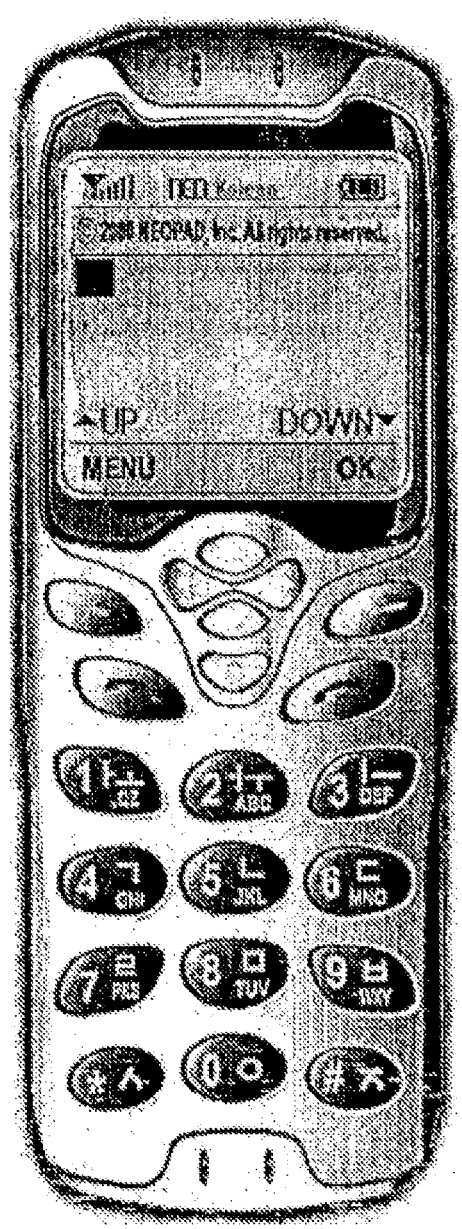
FIG. 14 illustrates a depiction of a cellular telephone having a keypad for Korean language entry in accordance with the present invention.

Methods for entering the Chinese characters by means of the keypad with 12 keys in number in accordance with the present invention are described. Table 8a shows the strokes used for each of the Chinese characters or radicals and the representative keys of character forms. In Table 8a, the examples of the radicals and the examples of the Chinese characters illustrates the possible radicals and the Chinese characters respectively, which can be made by using the first stroke of a Chinese character as to representative key and combining it with a character form. FIG. 13 shows an arrangement of the keypad using the stroke keys and the character form keys of Table 8a according to an embodiment of the present invention. As shown in FIG. 13, the strokes are allotted to the odd number keys on the keypad; the representative character forms are allotted to the even number keys; and the "郃" (radical), as a key standing for the 222 radicals in number, are allotted to the "#" key. The representative character form key stands for a group composed of similar character forms, like , , , , and character forms belonging to each of representative character form keys are disposed according to the priority of the frequency of use. As a result, the means of representative character entry for entering the Chinese characters are the stroke and the character form keys.

TABLE 8a

| Stroke key | Chinese character form representative key | Chinese character form | Example of Radical | Example of Chinese character |
|---|---|---|---|---|
| 一 | 一 | 一口口 | 木扌彳 | 相抬徹 |
| 丨 | 丨 | 丨丨丨 | 辶厂匚 | 这历区 |
| 丿 | 丿 | 丿丿丿 | 冂弋凵 | 同式凶 |
| 丶 | 丶 | 日日日 | 木雨宀 | 李露高 |
| 乙 | 乙 | 乙口 | 口又 | 围又 |

In Table 8a, the character form keys of 14 are the means for expressing the relations among the Chinese character groups, radicals, and strokes. A user enters the Chinese character, based on the character knowledge that which radical is used for a given Chinese character in the step of stroke entry. Therefore, if the user enters such character knowledge with the character form keys of 14, he/she can enter easily the Chinese characters through a few times of key presses. In addition, it is possible to carry out the method that he/she enters first the character form and next the stroke.

For example, in entering the Chinese character "簪" the radical is "钅"; the first stroke is ""; and the character form is "圕" which is allotted to the second order on the numeral key 2. Therefore, the user can find "簪" through three times of key entry (i.e., the entry of "" and "圕"). In other words, by entering directly the information, which the first stroke of "簪" is "" and the character form is "圕", to the system, the system can search and select rapidly the related Chinese characters and reduce considerably the number of the related Chinese characters, because the information about the character form of the desired Chinese character is entered in the course of progressing from the stroke to the radical and from the radical to the character form. In addition, the method that the user enters first the character form "圕" and next "" has the same effect.

Another embodiment for entering the Chinese characters is described. To begin with, when the user enters the first stroke of the first component of the desired Chinese character, all the radicals with the stroke are displayed. If the user selects the desired radical from the displayed radicals, all the Chinese characters with the radical are displayed. Next, when the user enters the first stroke of the next component of the desired Chinese character, the system displays all the Chinese characters with the first radical and the stroke. Finally, the user can select the desired Chinese character from the displayed Chinese characters. For example, in case of entering "簪", the user enters the first stroke "丶" and "圕". The radical with the character form "圕" is "钅" among the radicals "钅, 宀, 冫, 丶" beginning with the first stroke "". Therefore, the system displays all the Chinese characters having the radical "钅". Subsequently, when the user enters the first stroke "—" of "簪", the system displays all the Chinese character including "𠂉" so that the user can select the desired Chinese character from them. This method can also reduce the number of times of key entry and therefore, entry error.

There are various methods for entering the Chinese diameters according to the present invention as follows:

(1) To enter using only five stroke keys constituting the Chinese character;
(2) To enter using five stroke keys constituting the Chinese character and the radicals together;
(3) To enter using five stroke keys constituting the Chinese character and the character form keys together; and
(4) To enter using five stroke keys constituting the Chinese character, the character form keys, and the radicals together.

If Method 4 of the present invention is combined with Method 1, Method 2 and Method 3, it is possible to constitute a special dictionary and index file to predict a word composed of particular letters, and improve the existing Chinese character entry system using the conventional methods and arts, considerably. As mentioned above, the methods for entering the Chinese characters according to the present invention are methods that the concepts of Method 1, Method 2, Method 3, and Method 4 are combined compositively. In the present invention, the strokes and the character forms are considered as characters for convenience sake, but it is unconcerned with the nature of present invention.

The method for entering the Chinese characters according to the present invention is compared with the existing method. "The symbol definition apparatus" (U.S. Pat. No. 5,187,480, Date of Patent: Feb. 16, 1993, hereinafter referred to as "T method"). In the T method, the entry means are five or eight strokes. If the user enters these strokes according to the writing order of the Chinese character, the Chinese characters and radicals corresponding to the entered strokes are displayed, and the user selects the desired Chinese from the displayed Chinese characters. Here, the displayed Chinese characters are disposed according to the static dictionary structure that disposes the frequently used Chinese characters on the head. However, in the present invention, the entry means are five strokes and 14 character form keys. Moreover, four kinds of entry methods are provided basically, i.e., (1) a method using five strokes; (2) a method using five strokes and radicals together; (3) a method using five strokes and character form keys together; and (4) a method using five strokes, radicals, and character form keys together. In addition, the displayed Chinese characters are disposed according to the dynamic dictionary structure that disposes preferentially the frequently used Chinese Characters on the front position is considering the dynamically estimated use frequency. Therefore, the user can choose the entry method in accordance with one's preference. Moreover, the dynamic dictionary structure and the display method can improve the entry speed considerably.

Tables 8b and 8c show the entry speed of the method of the present invention and the T method. As shown in Table 8b, in entering randomly the Chinese characters, the method of the present invention can improve the entry speed by about 43%, compared to the T method. In entering the common colloquial sentence, as shown in Table 8c, the method of the present invention can improve the entry speed by about 13%, compared to the T method.

TABLE 8b

| Example (Chinese character) | The number of key entry (Present invention) | The number of key entry (T method) |
|---|---|---|
| 梓 | 3 | 4 |
| 指 | 4 | 5 |
| 柳 | 5 | 8 |
| 题 | 3 | 8 |
| 猎 | 4 | 5 |
| 比 | 5 | 7 |
| 肉 | 3 | 6 |
| 武 | 4 | 6 |
| 丽 | 5 | 6 |
| 只 | 3 | 5 |
| 城 | 4 | 6 |
| 寄 | 5 | 6 |
| 闽 | 7 | 8 |
| 乒 | 6 | 7 |
| Total | 61 | 87 |
| Input efficiency | 143% | 100% |

TABLE 8c

| Example (sentence) | The number of key entry (Present invention) | The number of key entry (T method) |
|---|---|---|
| 你近来身体可好 | 17 | 19 |
| 都是自己人,还客气什么 | 24 | 27 |
| 别尽说空话 | 18 | 21 |
| 你马上就点吗 | 16 | 19 |
| 做题时马虎一点就容易出错 | 39 | 47 |
| 嘟囔什么 | 10 | 11 |
| 喝你的吧 | 14 | 15 |

TABLE 8c-continued

| Example (sentence) | The number of key entry (Present invention) | The number of key entry (T method) |
|---|---|---|
| 我得研究工作 | 12 | 14 |
| 你说呢 | 9 | 9 |
| 你居然瞒到我头上来了 | 23 | 25 |
| 你看着办 | 10 | 10 |
| Total | 192 | 217 |
| Input efficiency | 113% | 100% |

Other embodiments for entering the Chinese characters are described, which apply Method 1, Method 2, Method 3 and Method 4 of the present invention to the entry method by means of the Bopomofo character symbols.

Figure 1F:
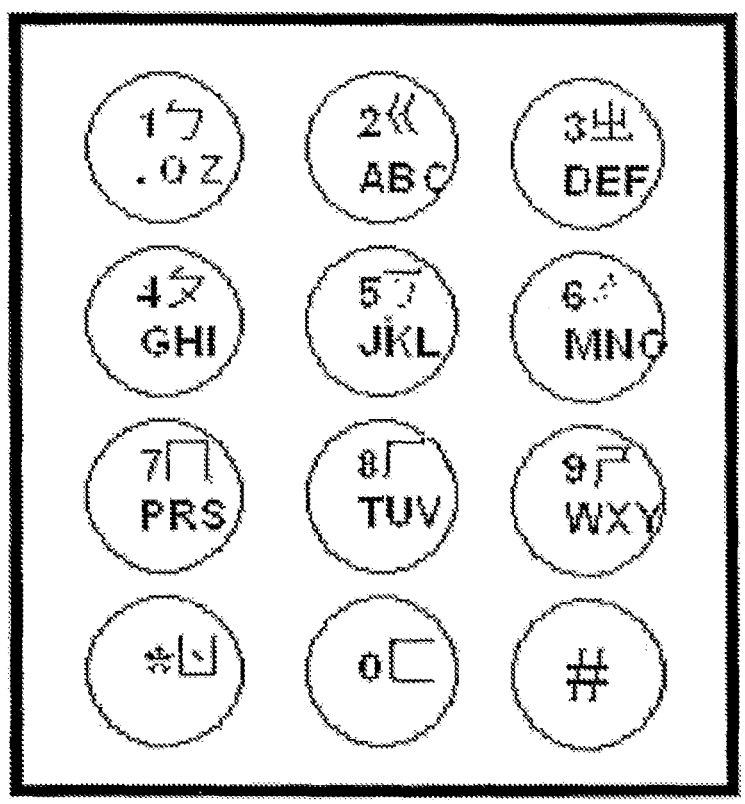
FIG. 1f shows a Bopomofo symbol layout of a keypad of a cellular telephone for entering Chinese characters.
Figure 1G:
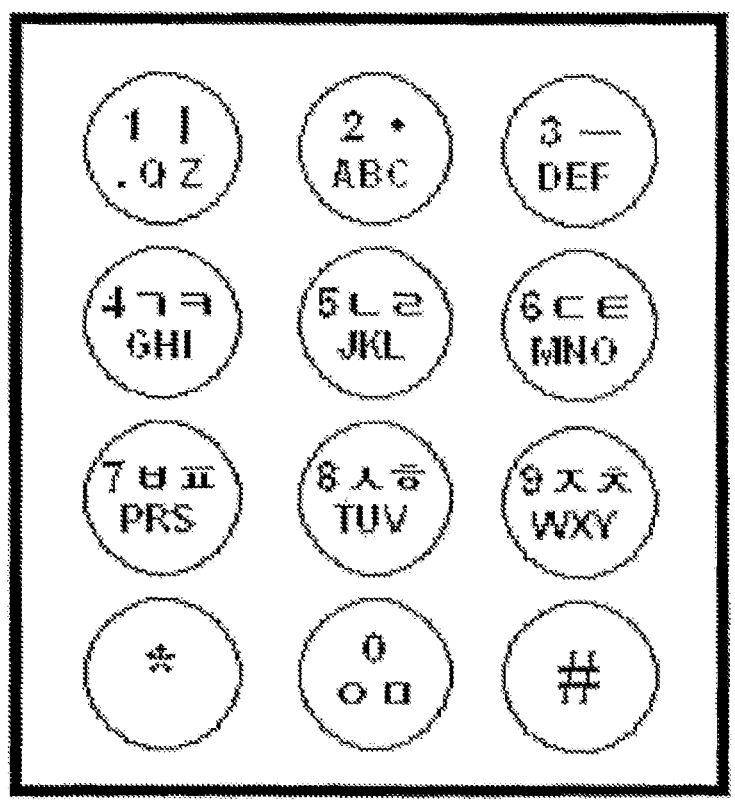
FIG. 1g shows a Korean alphabet layout of a keypad of a cellular telephone.
Figure 1H:
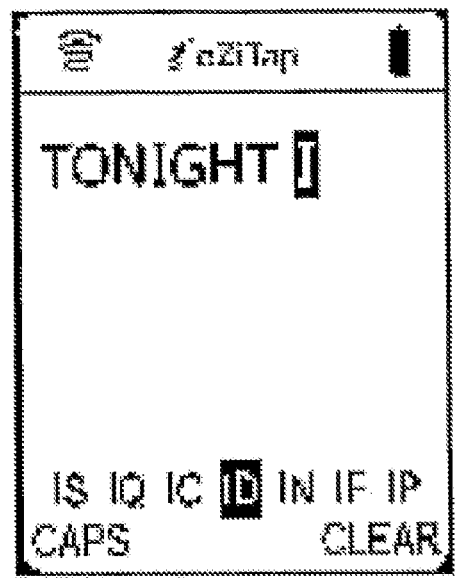
FIG. 1h illustrates an embodiment according to the eZi method as a single-tap method.
Figure 1I:
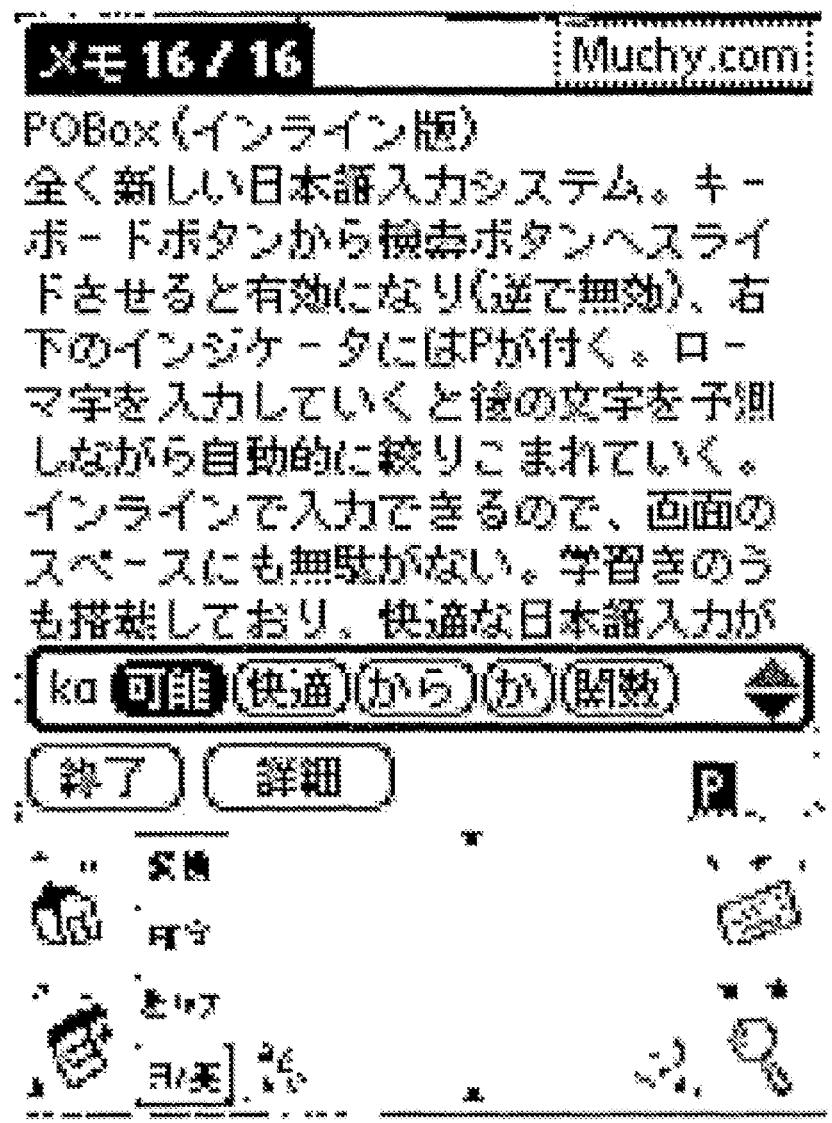
FIG. 1i illustrates an embodiment for entering Japanese characters in accordance with the POS system.

FIG. 1f shows a Bopomofo symbol layout of a keypad of cellular telephone for entering Chinese characters. The method for entering "早安" is described, using Table 9. The Bopomofo notation for "早安" is ㄗㄠˇㄢ.

TABLE 9

| Entry character | Represen- tative character key | Entry key of virtual mode | |
|---|---|---|---|
| | | Numeral key | Function key |
| ㄅ | ㄅ | 1 | 1 |
| ㄉ | | 2 | * |
| ㄚ | | 3 | # |
| ㄍ | ㄍ | 2 | 2 |
| ㄐ | | 1 | * |
| ㄎ | | 3 | # |
| ㄓ | ㄓ | 1 | 3 |
| ㄗ | | 2 | * |
| ㄢ | | 3 | # |
| ㄦ | | 6 | ## |
| ㄋ | ㄋ | 1 | 4 |
| ㄊ | | 4 | * |
| ㄜ | | 7 | # |
| ㄅ | ㄅ | 5 | 5 |
| ㄑ | | 8 | * |
| ㄟ | | 0 | # |
| ㄑ | ㄑ | 3 | 6 |
| ㄒ | | 6 | * |
| ㄣ | | 9 | # |
| ー | | # | ## |
| ㄇ | ㄇ | 4 | 7 |
| ㄏ | | 7 | * |
| ㄝ | | * | # |
| ㄈ | ㄈ | 7 | 8 |
| ㄒ | | 8 | * |
| ㄤ | | 9 | # |
| ㄡ | | | ## |
| ㄕ | ㄕ | 6 | 9 |
| ㄙ | | 9 | * |
| ㄛ | | # | # |
| ㄨ | | | ## |
| ㄈ | ㄈ | * | 0 |
| ㄌ | | 0 | * |
| ㄥ | | # | # |
| ㄅ | ㄅ | * | * |
| ㄥ | | 0 | 0 |
| ㄩ | | # | # |

Considering the configuration format of Table 9, the methods for entering "早安" according to Method 1, Method 2, Method 3 and Method 4 are identical with the methods for entering English words according to Method 1, Method 2, Method 3, and Method 4. Therefore, the detailed description is omitted.

As another method for entering the Chinese characters, there is a pinyin entry method. The pinyin method is a method that the pronunciation of the Chinese characters is represented as the alphabet letters and the desired Chinese characters are entered using the alphabet letters as a basic entry unit. Table 10a shows the pinyin and the corresponding Chinese character, the four-tone information, and the virtual keypad entry keys.

TABLE 10a

| Chinese character pinyin | Repre- sentative character | Entry key of virtual keypad | | Example of Chinese character |
|---|---|---|---|---|
| | | Numeral key | four-tone key | |
| A | A | 1 | ‾ ⁄ ∨ ﹨ ' | 阿 |
| AI | | . | . | 哎 |
| AN | | . | . | 安 |
| ... | | . | . | ... |
| ANG | | . | . | 肮 |
| AO | | . | . | 凹 |
| BA | B | 1 | ‾ ⁄ ∨ ﹨ ' | 八 |
| BAI | | . | . | 白 |
| BAN | | . | . | 般 |
| ... | | . | . | ... |
| BO | | . | . | 波 |
| BU | | . | . | 不 |
| ... | ... | ... | .... | ... |
| ZA | Z | 1 | ‾ ⁄ ∨ ﹨ ' | 扎 |
| ZAI | | . | . | 灾 |
| ZAN | | . | . | 糌 |
| ... | | . | . | ... |
| ZUN | | . | . | 尊 |
| ZUO | | . | . | 作 |

As shown in Table 10a, the representative character keys and the virtual keypad entry keys are chosen according to the pinyin for each of Chinese characters. The input efficiency of the Chinese character is determined by the input efficiency of alphabet letter and the input/output method of the corresponding pinyin character string, because the pinyin notation of Chinese character is identical with a word composed of alphabetic characters. The methods for entering the Chinese character pinyin according to Method 1, Method 2, Method 3 and Method 4 are similar with the entry methods of English words according to Method 1, Method 2, Method 3, and Method 4. By the way, the many Chinese characters have identical pronunciation although they are different Chinese characters because of the homophony of the Chinese characters. To overcome this, by exhibiting always the four-tone markets on the screen and entering additionally the four-tone markers, the number of the related Chinese characters can be reduced considerably, thereby embodying Method 3 of the present invention effectively. In addition, it is possible to enter the Chinese characters using only consonants. There is a method using a letter characteristic database including the frequently used syllables. Here, the first pinyin letter of the desired Chinese character is entered, and, then, the frequently used syllables, as the possible next pinyin, are searched from the database and displayed.

A method for entering the Chinese character pinyin according to Method 4 of the present invention is described. In the present invention, the pinyin character strings have definite rules between the first syllable and the next syllable, and therefore, the pinyin input efficiency can improved considerably by establishing the preparatory information including these rules. In the present invention, if the first letter of the pinyin is a consonant, the next vowel or consonant can be selected from "A, E, I, O, U" and "N, H". The letters of the third syllable are arranged according to definite rules, and, therefore, by predicting and displaying these letter series, the user can select the desired character. For example, in entering the pinyin "MING", the user presses "M" key which is allotted to the numeral key 6. There is a rule that the follow-up vowel of "M" can be selected from "A", "E", "I", "O", and "U". Therefore, the system predicts and displays the possible next vowels "A", "E", "I", "O", and "U", and, then, the user selects "I". There is a rule that the follow-up letters of "I" can be only selected from "AN", "AO", "E", "N", "NG" and "U". Therefore, the system predicts and displays these letters, and, then, the user selects and enters the desired letters. Consequently, by providing the knowledge about all the pinyin character strings as the preparatory information for Method 4 of the present invention, the efficiency of the pinyin input can be improved considerably.

Another feature of the pinyin input according to Method 4 is the method for displaying the related Chinese characters corresponding to the pinyin. For example, if the user enters the pinyin "de(鵝)" for the first time, the system displays the related Chinese characters "的,地,得,鵝,底,锝,冬,至" in the order named. However, if the user enters the pinyin "de(鵝)" for the second time, the system displays the related Chinese characters "鵝,的,地,得,底,锝,冬,至" in the previously used order so that the user can select and enter easily the desired Chinese character, thereby reducing the stress accompanied with the selection process.

Table 10b shows the number of times of key presses in case of catering a Chinese character for the second time after entering it for the first time. As shown in Table 10b, the method according to the present invention can improve the input efficiency by two times, compared to the T method.

TABLE 10b

| Example of pinyin entry (Chinese Character and pinyin) | The number of pinyin key entry (Present invention) | The number of pinyin key entry (T method) |
| --- | --- | --- |
| 會 (Kuai) | 3 | 5 |
| 便 (Plan) | 3 | 8 |
| 等 (Deng) | 3 | 6 |
| 紅 (Hong) | 3 | 6 |
| 送 (Song) | 3 | 6 |
| 鉆 (Zuan) | 3 | 7 |
| 咱 (Zan) | 3 | 8 |
| 出 (Chu) | 3 | 4 |
| 愛 (Ai) | 3 | 5 |
| 总 (Zong) | 3 | 6 |
| Total | 30 | 61 |
| Input efficiency | 203% | 100% |

Methods for entering the Korean alphabet according to the present invention are described. In the present invention, the keypad and the constitution of the character keys use those in FIG. 14. Table 11 shows the Korean alphabetic letters, representative character keys, and character selection keys for use in the virtual input mode according to the preferred embodiments of Method 1, Method 2, Method 3, and Method 4.

TABLE 11

| Entry character | Representative character key | Virtual input mode key | |
| --- | --- | --- | --- |
| | | Numeral key | Function key |
| ㄱ | ㄱ | 44 | 4 |
| ㄴ | | 1 | ↑ |
| ㄷ | | 2 | ↓ |
| ㄹ | ㄹ | 5 | 5 |
| ㅁ | ㅁ | 66 | 6 |
| ㅂ | | 1 | ↑ |
| ㅃ | | 2 | ↓ |
| ㅅ | ㅅ | 7 | 7 |
| ㅇ | ㅇ | 8 | 8 |
| ㅈ | ㅈ | 99 | 9 |
| ㅉ | | 1 | ↑ |
| ㅊ | | 2 | ↓ |
| ㅋ | | ** | * |
| ㅌ | | 1 | ↑ |
| ㅍ | ㅍ | 00 | 0 |
| ㅎ | | 1 | ↑ |
| ㄲ | ㄲ | ## | # |
| ㄸ | | 1 | ↑ |
| ㅆ | | 2 | ↓ |
| ㅏ | ㅏ | 1 | 1 |
| ㅗ | | 11 | ↑ |
| ㅓ | ㅓ | 2 | 2 |
| ㅜ | | 22 | ↑ |
| ㅣ | ㅣ | 3 | 3 |
| ㅡ | | 33 | ↑ |

In Table 11, the definition for the entry of the vowel part consists of only six basic monophthongs, "ㅏ", "ㅓ", "ㅗ", "ㅜ", "ㅣ", and "ㅡ". The grouping and the representative character designation for diphthongs, such as "ㅑ", "ㅕ", "ㅛ", "ㅠ", "ㅐ", "ㅒ", "ㅔ", "ㅖ", "ㅚ", and "ㅟ" are separately defined. In the present invention, these diphthongs are formed by the combination of the cardinal vowels of six. Table 12a shows the rules of the cardinal vowel combination for entering Korean alphabetic vowels according to the present invention.

TABLE 12A

| Entry vowel | Basic vowel key combination | Representative character key | Entry vowel | Basic vowel key combination | Representative character key |
| --- | --- | --- | --- | --- | --- |
| ㅑ | ㅣ(3) + ㅏ(1) | ㅑ | ㅐ | ㅓ(2) + ㅣ(3) | ㅐ |
| ㅕ | ㅣ(3) + ㅓ(2) | ㅕ | ㅔ | ㅏ(1) + ㅣ(3) | ㅔ |
| ㅛ | ㅣ(3) + ㅗ(1) | ㅛ | | | |
| ㅠ | ㅣ(3) + ㅜ(2) | ㅠ | | | |
| ㅒ | ㅣ(3) + ㅏ(1) + ㅣ(3) | ㅒ | ㅚ | ㅡ(3) + ㅣ(3) | ㅚ |

TABLE 12A-continued

| Entry vowel | Basic vowel key combination | Representative character key | Entry vowel | Basic vowel key combination | Representative character key |
|---|---|---|---|---|---|
| ㅖ | ㅣ(3) + ㅓ(2) + ㅣ(3) | ㅓ | ㅚ | ㅗ(1) + ㅣ(3) | ㅗ |
| ㅙ | ㅜ(2) + ㅓ(2) + ㅣ(3) | ㅗ | ㅟ | ㅜ(2) + ㅓ(2) | ㅜ |
| ㅞ | | ㅜ | ㅘ | ㅗ(1) + ㅏ(1) | ㅏ |
| | | | ㅝ | ㅜ(2) + ㅣ(3) | ㅜ |

As shown in Table 12a, the feature of the Korean alphabetic vowel entry using the combination of cardinal vowel keys is that the entry method is appropriate for the structure of the Korean alphabet and takes effects in applying to Method 1, Method 2, Method 3, and Method 4. In Table 11, arrow symbols corresponds to the functions keys "↑" and "↓" on the cellular telephone.

As shown in Table 12a, the diphthongs such as "ㅑ", "ㅕ", "ㅛ", "ㅠ", "ㅒ", "ㅖ", "ㅢ", "ㅙ", and "ㅞ" are formed by the combination of the vowels such as "ㅏ", "ㅜ", "ㅓ", "ㅗ", "ㅣ", and "ㅡ". In the present invention, these combination vowels are allotted to each of representative keys. In case of pressing the representative keys, the vowels belonging to the representative keys are displayed simultaneously. The user selects and enters the one among the displayed vowels. Therefore, the vowel input efficiency can be improved considerably. For example, when the user presses "1" key to which "ㅏ" and "ㅗ" are allotted and marked, the group of vowels belonging to the representative key "ㅏ", such as "ㅏ", "ㅐ", "ㅑ", and "ㅒ", are displayed at one time. Subsequently, the user can select and enter the desired vowel among the displayed vowels. Accordingly, the user can reduce the times of entry and enter each of 21 vowels correctly using six vowels allotted to the three keys.

In entering the Korean alphabetic consonants, aspiration such as "ㅋ", "ㅌ", "ㅍ", "ㅊ", and "ㅎ", and fortis such as "ㄲ", "ㄸ", "ㅃ", "ㅉ", and "ㅆ" can be allotted to each of representative keys and entered. Therefore the user needs not to memorize other symbols and rules or to use the multi-tap method. In addition, by allotting multiple consonants to one key the entry method ensuring high visibility and recognizability can be provided.

As another method, the Korean alphabetic vowels can be formed by a Cheonjiin ("—", "•", "ㅣ") method, a prior art. Table 12b shows an example of method for entering the Korean alphabetic vowels, which applies the present invention to the Cheonjiin method.

selection keys according to the present invention can solve the problem. Specially, considering the Korean alphabet entry method according to Method 1 and 2 of the present invention, the above-mentioned keypad constitution and the entry rules work great. Because the vowels are allotted to numeral keys "1", "2", and "3" without mixing with consonants, the vowels can be always displayed. Therefore, the user can enter the entire word by entering only the consonants of the word. In addition, by adding a Korean dictionary, the entry efficiency can be improved considerably.

Now, embodiments for entering the Korean language "아버지" according to the present invention are described.

The first consonant of "아버지" is "ㅇ" belonging to the representative character "ㅇ". When the user presses the numeral key 0 to enter "ㅇ", the system displays "ㅇ" and "ㅎ" directly. The user can select and enter "ㅎ" using the corresponding function key or numeral key. Next, the user presses the numeral key 1 because the vowel "ㅏ" belongs to the representative character key "ㅏ". The system displays "ㅏ", "ㅐ", "ㅑ", and "ㅒ". When the user select "ㅏ" using the corresponding key, the entry of "아" or is completed. However, actually, the user used to the Korean alphabet recognizes the word "아버지" at one time, and enters it continuously at once. Therefore, Method 2 of the present invention can be applied appropriately according to the same entry procedure.

Method 3 is more efficient. The Korean character has definite patterns such as [consonant+vowel], [consonant+vowel+consonant], and so on. These linguistic characteristics are introduced into Method 3. Namely, if the vowels are displayed always on the screen, only the consonant parts are entered and the vowel parts are selected from the vowels displayed. In case of entering "학교", if the user enters only the consonant parts "ㅎ", "ㄱ", and "ㄱ", the system according to the present invention stores the entered character string in the buffer, and displays "ㅇ" and "ㅎ" belonging to the representative numeral key of the first

TABLE 12B

| Entry vowel | Basic vowel key combination | Representative character key | Entry vowel | Basic vowel key combination | Representative character key |
|---|---|---|---|---|---|
| ㅏ | ㅣ + • | ㅣ | ㅣ | ㅣ | ㅣ |
| ㅗ | • + — | • | — | — | — |
| ㅓ | • + ㅣ | • | | | |
| ㅜ | — + • | — | | | |
| ㅑ | ㅣ + ↑ | ㅣ | ㅔ | +ㅣ +ㅣ | • |
| ㅕ | • + ↓ | • | ㅖ | ㅣ + ↓ | ㅣ |
| ㅛ | • + ↑ | • | | | |
| ㅠ | — + ↑ | — | | | |
| ㅐ | ㅣ + • + ↓ | ㅣ | ㅢ | — + ㅣ | — |
| ㅒ | • + ↓ + ㅣ | • | ㅚ | • + — + ㅣ | • |
| ㅔ | • + — + ↓ | • | ㅟ | — + ↓ | — |
| ㅖ | — + • + ↓ | — | ㅘ | • + — + ↑ | • |
| | | | ㅝ | — + • + ㅣ | — |

As shown in FIGS. 12a and 12b, although to press the same key can form plural vowels, the plural display and alphabet "ㅎ". The user selects and enters "ㅎ" using the corresponding key, and, then, the system requires the user to enter a vowel. By selecting and entering the vowel "ㅏ", "해" is formed. Next, the system displays the alphabets belonging to the representative key for "ㅓ" stored in the buffer. Subsequently, the above-mentioned processes are carried out identically. Method 3 changes into Method 4 by adding a Korean wordbook to Method 3.

Method 4 can improve the entry efficiency considerably. The Korean is wordbook, which contributes to the labor saving of the Korean alphabet entry according to the present invention, is established automatically by the dictionary system of the present invention, based on the words entered into the system according to the entry method of the present invention. Therefore, all the words that the use entered according to the method of the present invention are automatically registered in the dictionary to establish a user wordbook. Once a word is registered in the dictionary, the user can enter completely the same word by entering the first syllable of the word. Because, the system searches the dictionary and displays the words having the same first syllable automatically.

For example, Table 13 shows an example of dictionary with tree structure, composed of the words beginning with "대", such as "대학교", "대한민국", and "대형".

TABLE 13

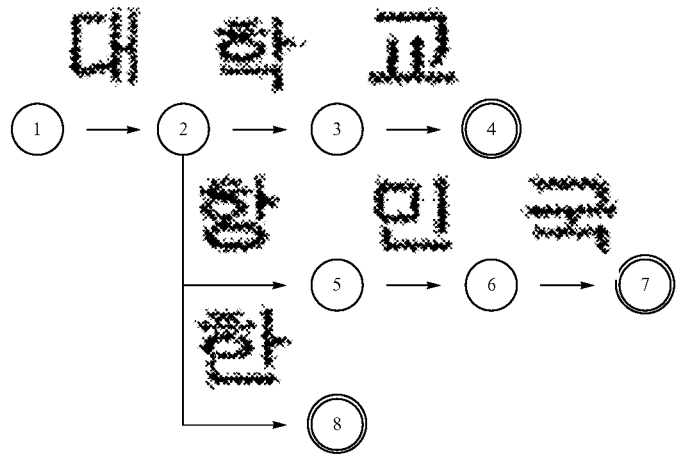

If a user enters the word "대한민국" in his message text for the first time, the system according to the present invention forms automatically a tree structure. Then, when the user enters again the word "대한민국" in his message text, he/she can find and enter "대한민국" by entering only one syllable "대" without the key entry for "한민국".

The Korean alphabet entry method according to Method 4 of the present invention contributes to the labour saving of the Korean alphabet entry by displaying the whole word by means of a limited number of key presses.

Table 14 shows the result that the Korean alphabet entry method of the present invention is compared with other Korean alphabet entry methods, such as Korean Patent No 0159191 (Date of Patent: Aug. 10, 1998, hereinafter referred to as "Method A"), and Korean Patent Application Nos. 10-1999-0052648 (Date of Application: Nov. 25, 1999, hereinafter referred to as "Method B"), 10-1999-0052650 (Date of Application: Nov. 25, 1999, hereinafter referred to as "Method C"), and 10-2000-0062182 (Date of Application: Oct. 21, 2000, hereinafter referral to as "Method D").

TABLE 14

| Method | The number of key entry to enter Korean consonants of 19 | The number of key entry to enter Korean vowels of 21 | Prediction function for word entry |
|---|---|---|---|
| A method | 36 times | 62 times | No |
| B method | 38 times | 50 times | No |
| C method | 38 times | 62 times | No |
| D method | 34 times | 62 times | No |
| The present invention | 29 times | 48 times | Yes |

As shown in Table 14, in the consonant part entry method, the present invention can improve the input efficiency (i.e., the number of times of key presses) by 19% compared to Method A; by 24% compared to Method B; by 24% compared to Method C; and by 15% compared to Method D. In the vowel part entry method, the present invention can improve the input efficiency (i.e., the number of times of key presses) by 23% compared to Method A; by 4% compared to Method B; by 23% compared to Method C; and by 23% compared to Method D.

Figure 15:
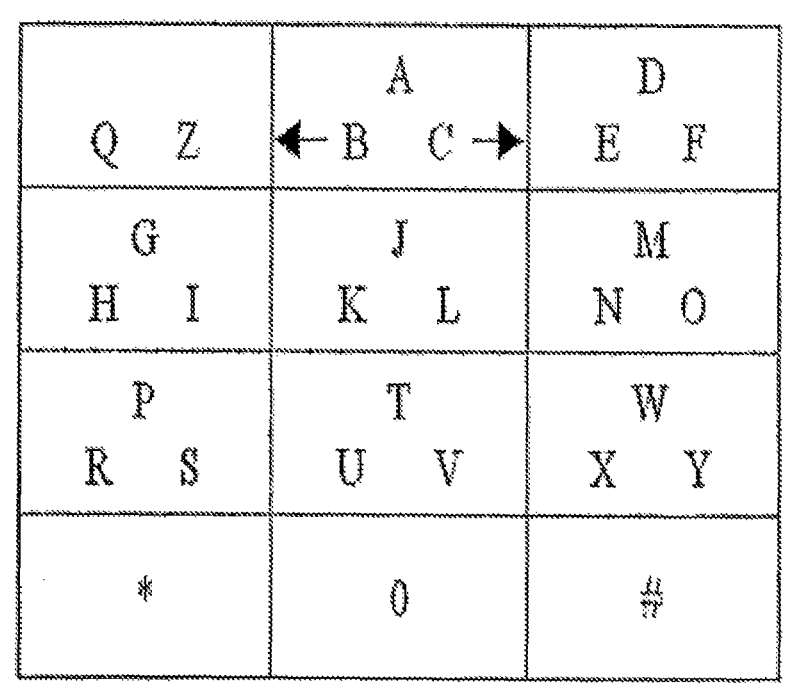

FIG. 15 illustrates an example of alphabet entry on a Personal Date Assistant (hereinafter referred to as "PDA") in accordance with the present invention. Generally, PDA uses a pen by the name of stylus as an entry instrument. If the method of the present invention is applied to the key stylus entry-based character entry system, the character entry system with excellent input efficiency, different from the key-press entry method of cellular telephone can be provided. The keys of keypad of cellular telephone are established by hardware, while PDA has a keypad, which is established by software, on a liquid crystal panel. Therefore, the input instruments of a cellular telephone and a PDA are different physically.

The software keys can send the input signal by pressing each of keys or lining with the pen. Therefore, if the methods of the present invention are applied to PDA, both keys and stylus pen can be used for the character entry on the virtual mode. Consequently, it is possible to enter characters through signaling starting point and up-down-right-left movement using a pen, instead of pressing the numeral keys. For example, if "A" is a representative character, the user presses a numeral key corresponding to "A" in order to enter A; lines lightly is upward from "A" in order to enter "B"; and lines lightly downward from "A" in order to enter "C". The result is identical with the character entry method using numeral keys. The above-mentioned method can be also applied to other languages.

FIG. 16 illustrates an example of an information service method using the preferred embodiment of the present invention. Today, various information services through mobile devices including a cellular telephone are in the phase of activation. For example, there are reservation services by means of electronic commerce, information retrieval services for telephone numbers and geographic information, and language learning services, and so on. Most of the telecommunication services need entering character data. The input data may be characters, numerals, symbols and so on. In the telecommunication services, to enter data easily helps the activation of these services. FIG. 16 shows the display provided in the airline reservation service as an example. As shown in FIG. 16, if the service requires entering user name, ID, destination and the place of departure as minimum character entry, the character entry methods according to the present invention can take effect.

Figure 17:
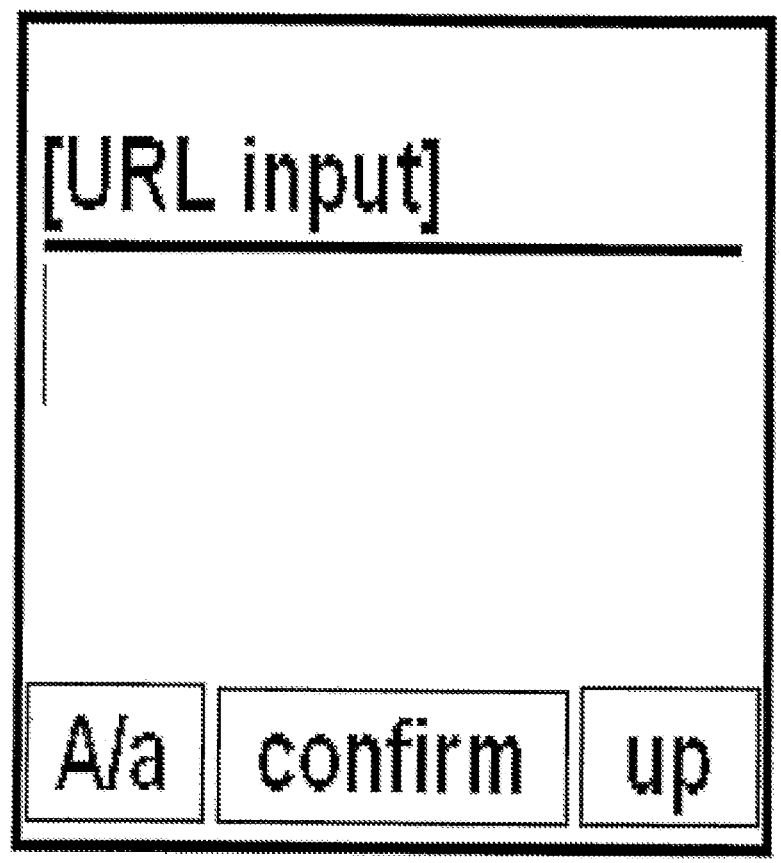
FIG. 17 illustrates an example of URL entry using the preferred embodiment of the present invention.

FIG. 17 shows an initial menu display of Microsoft's Mobile Explore provided on a cellular telephone. In entering URL on the menu display, the efficiency of character entry is important. The following example proves the superiority of the character entry methods according to the present invention, compared to the conventional methods. The general form of URL is, for example, "www.neopad.com". Here, the "www" and "com" parts are fixed, while the underlined part needs the entry efficiency. In the conventional multi-tap method, the user enters "www" by pressing a key five times, or by waiting two seconds after entering the that "w". Subsequently, the user presses the numeral keys 6 (MNO), 3 (DEF) 6 (MNO), 7 (PRS), 2 (ABC), and 3 (DEF) in turn in order to enter "neopad". As a result, the multi-tap method needs 14 times of key presses. However, Method 2 of the present invention requires 9 times of key presses to reduce the number of times of key presses to 64%.

Thus, the present invention ensures the efficiency of character entry for various languages in entering characters by means of a limited number of keys and a small keypad. The description of the present invention is intended to be illustrative, and not to limit the scope of the claims. Many alternatives, modifications, and variations will be apparent to those skilled in the art.

Finally, in the present invention, each character from the group of characters represented by the one of the representative characters is positioned at different predetermined locations on the screen. For example, the predetermined locations include a right side, a left side, a top side, and a bottom side of a position where the one of the representative characters is positioned. However, the predetermined locations are not limited to these four sides. Instead, each character from the group of characters represented by the one of the representative characters can be positioned at various predetermined locations centered on the position where the one of the representative characters is positioned.

INDUSTRIAL APPLICABILITY

As mentioned above, the methods for entering characters according to the present invention provides the following advantages:

(1) The present invention can reduce the number of times of key presses and the number of times of the possible entry error considerably, compared to the general multi-tap method using the existing keypad with a limited number of keys;

(2) The present invention can realize the single-tap method, which uses one key to enter one character, and, therefore, save the system resources (e.g., memory and processing rate) required in the existing dictionary-addition method;

(3) Because the present invention can be applied to the character entry systems for various languages using the grouping of character elements (A), the method for designating representative character keys (B), the method for selecting the desired character using (A) and (B), and the method for establishing the real keypad input mode and the virtual keypad input mode and functions thereof, the present invention is excellent in respect of adaptability of art, expandability, and economic efficiency;

(4) In combining with the conventional dictionary-addition character entry system, the present invention can provide more efficient methods for entering character and make the system process more intelligent; and (5) The present invention can promote the development of various information service contents and the use of services because the present invention can improve the data entry interface in the various information-communication services.

The invention claimed is:

1. A character input system comprising:
a software keypad including a plurality of multi-tap character keys;
a touch screen configured to display information and the software keypad;
a memory configured to store a plurality of characters and representative characters, the representative characters being characters representing a group of characters among the plurality of characters; and
a processor configured to:
operate a real keypad input mode for inputting a key on the software keypad;
receive a user selection of the key from the plurality of multi-tap character keys on the software keypad in the real keypad input mode;
in response to the user selection of the key, on which one of the representative characters is marked, change the real keypad input mode into a virtual keypad input mode and display, on the touch screen, the one of the representative characters and a group of characters represented by the one of the representative characters;
receive a user selection of an input character from the group of characters represented by the one of the representative characters by using the plurality of multi-tap character keys on the software keypad, in the virtual keypad input mode; and
generate the selected input character on the touch screen,
wherein the user selects and inputs the character on the software keypad with multi-tap character keys only,
wherein each multi-tap character from the group of characters represented by the one of the representative characters is positioned at different predetermined locations on the representative character keys,
wherein the predetermined locations include a right side, a left side, a top side, and a bottom side of a position where the one of the representative characters is positioned, and wherein the user selection of the each multi-tap character is performed by a signaling of up-down-right-left movement from user's touch point on the representative character keys by using user's finger or pen on the virtual keypad input mode.

2. The character input system according to claim 1, wherein the plurality of characters include characters, signs or symbols associated with a given language.

3. The character input system according to claim 1, wherein the software keypad is configured to select each character from the group of characters represented by the one of the representative characters on the touch screen.

4. A character input method using a system comprising a software keypad including a plurality of multi-tap character keys, a touch screen configured to display information and the software keypad, and a memory configured to store a plurality of characters and representative characters, the representative characters being characters representing a group of characters among the plurality of characters, the method comprising:
  allocating the representative characters and the plurality of characters to the keys on the software keypad;
  selecting, by a user, the key from the plurality of multi-tap character keys on the software keypad in a real keypad input mode;
  changing the real keypad input mode into a virtual keypad input mode in response to the user selection of the key, on which one of the representative characters is marked;
  displaying, on the touch screen, the one of the representative characters and a group of characters represented by the one of the representative characters;
  receiving a user selection of an input character from the group of characters represented by the one of the representative characters by using the plurality of multi-tap character keys on the software keypad, in the virtual keypad input mode; and
  generating the selected input character on the touch screen,
  wherein the user selects and inputs the character on the software keypad with multi-tap character keys only,
  wherein each multi-tap character from the group of characters represented by the one of the representative characters is positioned at different predetermined locations on the representative character keys,
  wherein the predetermined locations include a right side, a left side, a top side, and a bottom side of a position where the one of the representative characters is positioned, and
  wherein the user selection of the each multi-tap character is performed by a signaling of up-down-right-left movement from user's touch point on the representative character keys by using user's finger or pen on the virtual keypad input mode.

5. The character input method according to claim 4, wherein the plurality of characters include characters, signs or symbols associated with a given language.

6. The character input method according to claim 4, wherein the software keypad is configured to select each character from the group of characters represented by the one of the representative characters on the touch screen.

* * * * *